United States Patent
Wenzel

(10) Patent No.: US 12,070,181 B2
(45) Date of Patent: Aug. 27, 2024

(54) FLOOR CLEANING APPLIANCE AND METHOD FOR CLEANING A FLOOR SURFACE

(71) Applicant: Alfred Kärcher SE & Co. KG, Winnenden (DE)

(72) Inventor: Karl Engelbert Wenzel, Berglen (DE)

(73) Assignee: ALFRED KÄRCHER SE & CO. KG, Winnenden (DE)

( * ) Notice: Subject to any disclaimer, the term of this patent is extended or adjusted under 35 U.S.C. 154(b) by 284 days.

(21) Appl. No.: 16/671,728

(22) Filed: Nov. 1, 2019

(65) Prior Publication Data
US 2020/0069133 A1   Mar. 5, 2020

Related U.S. Application Data

(63) Continuation of application No. PCT/EP2017/060644, filed on May 4, 2017.

(51) Int. Cl.
| | |
|---|---|
| *A47L 9/28* | (2006.01) |
| *G01N 21/31* | (2006.01) |
| *G01N 21/47* | (2006.01) |
| *G05D 1/00* | (2024.01) |

(52) U.S. Cl.
CPC ............ *A47L 9/2826* (2013.01); *G01N 21/31* (2013.01); *G01N 21/4738* (2013.01); *G05D 1/0212* (2013.01); *A47L 2201/06* (2013.01)

(58) Field of Classification Search
CPC ... A47L 9/2826; A47L 2201/06; G01N 23/31; G01N 21/4738; G01N 21/33; G01N 21/3563; G01D 1/0212; G01D 2201/0203
USPC .................................................. 15/3
See application file for complete search history.

(56) References Cited

U.S. PATENT DOCUMENTS

| | | | |
|---|---|---|---|
| 1,268,963 A | 6/1918 | Gray |
| 1,596,041 A | 8/1926 | Young |
| 1,632,665 A | 6/1927 | Mitchell |
| 1,639,959 A | 8/1927 | Owen |
| 1,888,339 A | 11/1932 | White |
| 1,900,889 A | 3/1933 | Becker |

(Continued)

FOREIGN PATENT DOCUMENTS

| | | |
|---|---|---|
| AT | 0231900 | 2/1964 |
| BR | PI 0511488 | 1/2008 |

(Continued)

OTHER PUBLICATIONS

U.S. Appl. No. 16/784,137, filed Feb. 6, 2020, Pedlar et al.
(Continued)

*Primary Examiner* — Tom Rodgers
(74) *Attorney, Agent, or Firm* — Sheridan Ross P.C.

(57) ABSTRACT

The invention relates to a floor cleaning appliance which comprises at least one cleaning assembly for cleaning a floor surface and an optical detection device with which a floor type is determinable. In order to provide a floor cleaning appliance with which a reliable determination of the floor type is possible, it is proposed in accordance with the invention that the detection device is configured as or comprises a spectroscopic device with which the floor type is determinable on the basis of a spectrum of the floor surface recorded by reflection measurement. The invention also relates to a method for floor cleaning.

1 Claim, 7 Drawing Sheets

(56) References Cited

U.S. PATENT DOCUMENTS

| | | |
|---|---|---|
| 1,995,084 A | 3/1935 | Wichle |
| 1,999,696 A | 4/1935 | Kitto |
| 2,014,085 A | 9/1935 | Kroll et al. |
| 2,192,397 A | 3/1940 | Carlson |
| 2,263,762 A | 11/1941 | Dow et al. |
| 2,668,979 A | 2/1954 | MacFarland |
| 2,709,070 A | 5/1955 | Bielstein |
| 2,864,462 A | 12/1958 | Brace |
| 2,937,881 A | 5/1960 | Norrie |
| 3,005,224 A | 10/1961 | Taski |
| 3,020,576 A | 2/1962 | Gerber |
| 3,040,363 A | 6/1962 | Krammes et al. |
| 3,065,490 A | 11/1962 | Arones |
| 3,093,853 A | 6/1963 | Tamny |
| 3,186,021 A | 6/1965 | Krier et al. |
| 3,189,931 A | 6/1965 | Krier et al. |
| 3,193,862 A | 7/1965 | Lyon |
| D202,170 S | 9/1965 | Little et al. |
| 3,204,280 A | 9/1965 | Campbell |
| 3,206,787 A | 9/1965 | Daniels et al. |
| 3,224,524 A | 12/1965 | Laher |
| 3,233,274 A | 2/1966 | Kroll |
| 3,284,830 A | 11/1966 | Kroll |
| 3,322,350 A | 5/1967 | Heinicke |
| D213,586 S | 3/1969 | Howard et al. |
| 3,436,788 A | 4/1969 | Tamny |
| 3,461,479 A | 8/1969 | Tierney |
| 3,504,858 A | 4/1970 | Liddiard |
| 3,506,080 A | 4/1970 | Hott |
| RE26,950 E | 9/1970 | Hays |
| 3,584,439 A | 6/1971 | Gronholz |
| 3,604,051 A | 9/1971 | Wendall et al. |
| 3,631,558 A | 1/1972 | Kovacevoc |
| 3,639,936 A | 2/1972 | Ashton |
| 3,670,359 A | 6/1972 | Gutbrod |
| 3,701,177 A | 10/1972 | Meyer et al. |
| 3,702,488 A | 11/1972 | Kasper |
| 3,705,437 A | 12/1972 | Rukauina, Jr. et al. |
| 3,705,746 A | 12/1972 | McLeod |
| 3,755,993 A | 9/1973 | Cote |
| 3,760,649 A | 9/1973 | Decouzon et al. |
| 3,797,744 A | 3/1974 | Smith |
| 3,833,961 A | 9/1974 | Fortman et al. |
| 3,837,029 A | 9/1974 | Kasper |
| 3,846,865 A | 11/1974 | Holman |
| 3,871,826 A | 3/1975 | Bakay |
| 3,879,789 A | 4/1975 | Kasper |
| 3,883,301 A | 5/1975 | Emrick et al. |
| 3,886,623 A | 6/1975 | Landesman et al. |
| 3,892,003 A | 7/1975 | Peabody |
| 3,896,520 A | 7/1975 | Williams |
| 3,927,899 A | 12/1975 | Bough |
| 3,933,451 A | 1/1976 | Johansson |
| 3,955,236 A | 5/1976 | Mekelburg |
| 4,010,507 A | 3/1977 | Johnson |
| 4,019,218 A | 4/1977 | Cyphert |
| 4,037,289 A | 7/1977 | Dojan |
| 4,041,567 A | 8/1977 | Burgoon |
| 4,046,321 A | 9/1977 | Hewett |
| 4,108,268 A | 8/1978 | Block |
| 4,109,342 A | 8/1978 | Vermillion |
| 4,135,669 A | 1/1979 | Bridges et al. |
| 4,173,052 A | 11/1979 | Burgoon et al. |
| 4,196,492 A | 4/1980 | Johnson et al. |
| 4,200,952 A | 5/1980 | Smies et al. |
| 4,200,953 A | 5/1980 | Overton |
| 4,210,978 A | 7/1980 | Johnson et al. |
| 4,214,338 A | 7/1980 | Kyle et al. |
| 4,219,901 A | 9/1980 | Burgoon et al. |
| D258,963 S | 4/1981 | Phillips |
| 4,293,971 A | 10/1981 | Block |
| 4,310,944 A | 1/1982 | Kroll et al. |
| 4,314,385 A | 2/1982 | Wimsatt et al. |
| 4,328,014 A | 5/1982 | Burgoon et al. |
| 4,339,841 A | 7/1982 | Walhauser et al. |
| 4,348,783 A | 9/1982 | Swanson et al. |
| 4,354,569 A | 10/1982 | Eichholz |
| D267,084 S | 11/1982 | Bittinger |
| 4,363,152 A | 12/1982 | Karpantry |
| 4,383,551 A | 5/1983 | Lynch et al. |
| 4,429,433 A | 2/1984 | Burgoon |
| D273,621 S | 4/1984 | Haub et al. |
| D274,380 S | 6/1984 | Palmer |
| 4,457,036 A | 7/1984 | Carlson et al. |
| 4,457,043 A | 7/1984 | Oeberg et al. |
| 4,467,494 A | 8/1984 | Jones |
| 4,492,002 A | 1/1985 | Waldhauser et al. |
| 4,499,624 A | 2/1985 | Bloom et al. |
| 4,532,667 A | 8/1985 | Komesker et al. |
| 4,538,695 A | 9/1985 | Bradt |
| 4,553,626 A | 11/1985 | Kazmierczak et al. |
| 4,554,701 A | 11/1985 | Van Raaij |
| 4,572,023 A | 2/1986 | Euler |
| 4,580,313 A | 4/1986 | Blehert |
| 4,586,208 A | 5/1986 | Trevarthen |
| 4,596,061 A | 6/1986 | Henning |
| 4,611,363 A | 9/1986 | Samuelsson |
| 4,633,541 A | 1/1987 | Block |
| 4,654,918 A | 4/1987 | Cooper |
| D290,053 S | 5/1987 | Block |
| D290,054 S | 5/1987 | Block |
| 4,674,048 A | 6/1987 | Okumura |
| 4,675,935 A | 6/1987 | Kasper et al. |
| 4,696,593 A | 9/1987 | Bayless |
| 4,700,427 A | 10/1987 | Knepper |
| 4,701,893 A | 10/1987 | Muller et al. |
| 4,710,020 A | 12/1987 | Maddox et al. |
| 4,715,087 A | 12/1987 | Todd et al. |
| 4,716,980 A | 1/1988 | Butler |
| 4,731,956 A | 3/1988 | Wood |
| 4,736,116 A | 4/1988 | Pavlak, Jr. et al. |
| 4,741,069 A | 5/1988 | Helm et al. |
| 4,742,652 A | 5/1988 | Cannan et al. |
| 4,751,658 A | 6/1988 | Kadonoff et al. |
| 4,759,094 A | 7/1988 | Palmer et al. |
| 4,772,875 A | 9/1988 | Maddox et al. |
| 4,773,113 A | 9/1988 | Russell |
| 4,777,416 A | 10/1988 | George, II et al. |
| 4,787,646 A | 11/1988 | Kamlukin et al. |
| 4,790,402 A | 12/1988 | Field et al. |
| 4,799,286 A | 1/1989 | Rubin |
| 4,803,753 A | 2/1989 | Palmer |
| 4,805,258 A | 2/1989 | Sitarski et al. |
| 4,809,397 A | 3/1989 | Jacobs et al. |
| 4,815,008 A | 3/1989 | Kadonoff et al. |
| 4,815,840 A | 3/1989 | Benayad-Cherif et al. |
| 4,819,676 A | 4/1989 | Blehert et al. |
| 4,821,192 A | 4/1989 | Taivalkoski et al. |
| 4,821,958 A | 4/1989 | Shaffer |
| 4,829,442 A | 5/1989 | Kadonoff et al. |
| 4,839,037 A | 6/1989 | Bertelsen et al. |
| 4,846,297 A | 7/1989 | Field et al. |
| 4,847,944 A | 7/1989 | Lackner |
| 4,850,077 A | 7/1989 | Venturini |
| 4,874,055 A | 10/1989 | Beer |
| 4,879,784 A | 11/1989 | Shero |
| 4,884,313 A | 12/1989 | Zoni |
| 4,920,997 A | 5/1990 | Vetter et al. |
| 4,922,575 A | 5/1990 | Riemann |
| 4,939,808 A | 7/1990 | Roden et al. |
| 4,991,254 A | 2/1991 | Roden et al. |
| 4,996,468 A | 2/1991 | Field et al. |
| 5,005,128 A | 4/1991 | Robins et al. |
| 5,005,597 A | 4/1991 | Popelier et al. |
| 5,020,620 A | 6/1991 | Field |
| 5,026,488 A | 6/1991 | Mesheau |
| 5,027,464 A | 7/1991 | Knowlton |
| 5,032,775 A | 7/1991 | Mizuno et al. |
| 5,044,043 A | 9/1991 | Field et al. |
| 5,045,118 A | 9/1991 | Mason et al. |
| 5,048,202 A | 9/1991 | Shero |
| 5,051,906 A | 9/1991 | Evans, Jr. et al. |
| 5,054,150 A | 10/1991 | Best et al. |
| 5,054,158 A | 10/1991 | Williams et al. |

(56) References Cited

U.S. PATENT DOCUMENTS

| | | |
|---|---|---|
| 5,058,235 A | 10/1991 | Charky |
| 5,075,921 A | 12/1991 | Gleadall |
| D323,797 S | 2/1992 | Oslapas et al. |
| 5,090,083 A | 2/1992 | Wulff |
| 5,093,955 A | 3/1992 | Blehert et al. |
| 5,109,566 A | 5/1992 | Kobayashi et al. |
| 5,117,944 A | 6/1992 | Hurtevent |
| 5,127,124 A | 7/1992 | Palmer et al. |
| 5,135,080 A | 8/1992 | Haston |
| 5,138,742 A | 8/1992 | Charky |
| 5,168,947 A | 12/1992 | Rodenborn |
| 5,174,730 A | 12/1992 | Nieuwkamp et al. |
| 5,177,828 A | 1/1993 | Von Vett |
| 5,184,372 A | 2/1993 | Mache |
| 5,212,848 A | 5/1993 | Geyer |
| 5,217,166 A | 6/1993 | Schulze et al. |
| 5,221,026 A | 6/1993 | Williams |
| D337,185 S | 7/1993 | Wulff |
| 5,226,941 A | 7/1993 | Uibel et al. |
| 5,239,720 A | 8/1993 | Wood et al. |
| 5,245,144 A | 9/1993 | Stammen |
| 5,265,300 A | 11/1993 | O'Hara et al. |
| 5,279,672 A | 1/1994 | Betker et al. |
| 5,279,683 A | 1/1994 | Okada et al. |
| 5,279,688 A | 1/1994 | Isokawa et al. |
| 5,279,696 A | 1/1994 | Zangenfeind et al. |
| 5,279,699 A | 1/1994 | Taguchi et al. |
| 5,279,701 A | 1/1994 | Shigeta et al. |
| 5,298,080 A | 3/1994 | Von Vett |
| 5,303,448 A | 4/1994 | Hennessey et al. |
| 5,307,538 A | 5/1994 | Rench et al. |
| 5,311,892 A | 5/1994 | Adelt et al. |
| 5,349,718 A | 9/1994 | Gibbon |
| 5,360,307 A | 11/1994 | Schemm et al. |
| 5,364,114 A | 11/1994 | Petersen |
| 5,371,918 A | 12/1994 | Shero |
| 5,372,376 A | 12/1994 | Pharaoh |
| 5,377,376 A | 1/1995 | Wood et al. |
| 5,377,382 A | 1/1995 | Bores et al. |
| 5,383,605 A | 1/1995 | Teague |
| 5,390,690 A | 2/1995 | Blaga |
| 5,403,152 A | 4/1995 | Trautloff et al. |
| 5,403,473 A | 4/1995 | Moorehead et al. |
| 5,416,949 A | 5/1995 | Jute |
| 5,419,006 A | 5/1995 | Duthie |
| 5,426,805 A | 6/1995 | Fisher |
| 5,435,038 A | 7/1995 | Sauers |
| D361,414 S | 8/1995 | Trautloff et al. |
| RE35,033 E | 9/1995 | Waldhauser |
| 5,455,979 A | 10/1995 | Bores et al. |
| 5,455,985 A | 10/1995 | Hamline et al. |
| D364,012 S | 11/1995 | Bothun et al. |
| 5,463,791 A | 11/1995 | Roden |
| 5,465,451 A | 11/1995 | Stegens |
| 5,465,456 A | 11/1995 | Fellhauer et al. |
| 5,467,500 A | 11/1995 | O'Hara et al. |
| D365,423 S | 12/1995 | Bores et al. |
| 5,485,653 A | 1/1996 | Knowlton et al. |
| 5,500,979 A | 3/1996 | Worwag |
| D369,446 S | 4/1996 | Smith |
| 5,502,868 A | 4/1996 | Braeendle |
| 5,509,162 A | 4/1996 | Burgoon |
| D370,320 S | 5/1996 | Hachtmann |
| 5,513,409 A | 5/1996 | Biegel |
| 5,524,320 A | 6/1996 | Zachhuber |
| 5,537,712 A | 7/1996 | Weber et al. |
| 5,555,595 A | 9/1996 | Ligman |
| 5,555,596 A | 9/1996 | Knowlton et al. |
| D376,227 S | 12/1996 | Knowlton et al. |
| 5,607,178 A | 3/1997 | Legatt et al. |
| 5,608,947 A | 3/1997 | Knowlton et al. |
| 5,611,108 A | 3/1997 | Knowlton et al. |
| 5,620,309 A | 4/1997 | Todden et al. |
| 5,625,920 A | 5/1997 | Bores et al. |
| 5,628,086 A | 5/1997 | Knowlton et al. |
| 5,630,246 A | 5/1997 | Knowlton et al. |
| D380,070 S | 6/1997 | Shero |
| D381,480 S | 7/1997 | Linville et al. |
| D382,383 S | 8/1997 | Knowlton et al. |
| 5,653,261 A | 8/1997 | Dalhart et al. |
| 5,655,254 A | 8/1997 | Bores et al. |
| D391,697 S | 3/1998 | Knowlton et al. |
| 5,742,975 A | 4/1998 | Knowlton et al. |
| 5,768,742 A | 6/1998 | Kohl et al. |
| 5,784,754 A | 7/1998 | Roden et al. |
| 5,785,453 A | 7/1998 | Marty et al. |
| 5,802,665 A | 9/1998 | Knowlton et al. |
| 5,813,086 A | 9/1998 | Ueno et al. |
| 5,881,417 A | 3/1999 | Knowlton |
| 5,890,258 A | 4/1999 | Lee |
| 5,898,970 A | 5/1999 | Straiton |
| 5,901,409 A | 5/1999 | Schick et al. |
| 5,911,938 A | 6/1999 | El et al. |
| 5,920,953 A | 7/1999 | Shero |
| 5,943,733 A | 8/1999 | Tagliaferri |
| 5,984,031 A | 11/1999 | Velke et al. |
| 5,993,563 A | 11/1999 | Strickland et al. |
| D420,473 S | 2/2000 | Shero |
| 6,023,813 A | 2/2000 | Thatcher et al. |
| 6,030,465 A | 2/2000 | Marcussen et al. |
| 6,032,326 A | 3/2000 | Roden et al. |
| 6,041,471 A | 3/2000 | Charky et al. |
| 6,059,055 A | 5/2000 | Velke et al. |
| 6,073,304 A | 6/2000 | Knowlton et al. |
| 6,088,873 A | 7/2000 | Pacchini et al. |
| 6,131,240 A | 10/2000 | Shark et al. |
| 6,145,855 A | 11/2000 | Bellis, Jr. et al. |
| 6,158,084 A | 12/2000 | Weber et al. |
| 6,158,673 A | 12/2000 | Toetschinger |
| 6,182,328 B1 | 2/2001 | Roden |
| 6,206,980 B1 | 3/2001 | Robinson |
| 6,212,731 B1 | 4/2001 | Eckerlein |
| RE37,162 E | 5/2001 | Roden |
| 6,226,983 B1 | 5/2001 | Roden |
| 6,227,957 B1 | 5/2001 | Legatt et al. |
| 6,230,363 B1 | 5/2001 | Kawai et al. |
| 6,266,892 B1 | 7/2001 | Haynie |
| 6,267,190 B1 | 7/2001 | Micheletti |
| 6,283,170 B1 | 9/2001 | Robinson |
| 6,302,230 B1 | 10/2001 | Kamen et al. |
| 6,338,013 B1 | 1/2002 | Ruffner |
| 6,347,681 B1 | 2/2002 | Patmont et al. |
| 6,357,070 B1 | 3/2002 | Venard et al. |
| 6,367,120 B2 | 4/2002 | Beauchamp |
| 6,371,228 B1 | 4/2002 | Husted et al. |
| 6,397,429 B1 | 6/2002 | Legatt et al. |
| 6,421,868 B1 | 7/2002 | Tran |
| 6,425,958 B1 | 7/2002 | Giddings et al. |
| 6,427,285 B1 | 8/2002 | Legatt et al. |
| 6,428,590 B1 | 8/2002 | Lehman et al. |
| 6,431,217 B2 | 8/2002 | Robinson |
| 6,431,302 B2 | 8/2002 | Patmont et al. |
| 6,442,789 B1 | 9/2002 | Legatt et al. |
| 6,450,867 B1 | 9/2002 | Legatt |
| 6,453,506 B1 | 9/2002 | Sumner |
| 6,464,025 B1 | 10/2002 | Koeper et al. |
| 6,484,353 B2 | 11/2002 | Rau |
| 6,490,849 B1 | 12/2002 | Scag et al. |
| 6,497,422 B1 | 12/2002 | Bellis, Jr. et al. |
| 6,502,017 B2 | 12/2002 | Ruffner |
| 6,519,808 B2 | 2/2003 | Legatt et al. |
| 6,530,821 B2 | 3/2003 | Legatt et al. |
| 6,533,871 B2 | 3/2003 | Zahuranec et al. |
| 6,535,793 B2 | 3/2003 | Allard |
| 6,553,609 B2 | 4/2003 | Tremmel et al. |
| 6,554,207 B2 | 4/2003 | Ebberts |
| 6,571,805 B2 | 6/2003 | Hoenisch et al. |
| 6,585,827 B2 | 7/2003 | Field et al. |
| 6,594,844 B2 | 7/2003 | Jones |
| 6,600,981 B2 | 7/2003 | Ruffner |
| 6,625,843 B2 | 9/2003 | Kim et al. |
| 6,629,333 B2 | 10/2003 | Bolden et al. |
| 6,647,585 B1 | 11/2003 | Robinson |
| 6,650,975 B2 | 11/2003 | Ruffner |

(56) References Cited

U.S. PATENT DOCUMENTS

| | | |
|---|---|---|
| 6,671,925 B2 | 1/2004 | Field et al. |
| 6,681,433 B1 | 1/2004 | Ruuska et al. |
| 6,684,452 B2 | 2/2004 | Lehman et al. |
| 6,705,332 B2 | 3/2004 | Field et al. |
| 6,721,990 B2 | 4/2004 | Zahuranec et al. |
| 6,725,512 B2 | 4/2004 | Carter et al. |
| 6,735,811 B2 | 5/2004 | Field et al. |
| 6,735,812 B2 | 5/2004 | Hekman et al. |
| 6,760,947 B2 | 7/2004 | Stuchlik |
| 6,772,475 B2 | 8/2004 | Weber et al. |
| 6,789,290 B2 | 9/2004 | Kent et al. |
| 6,842,940 B2 | 1/2005 | Christopher et al. |
| 6,845,829 B2 | 1/2005 | Hafendorfer |
| 6,871,371 B2 | 3/2005 | Guest |
| 6,880,199 B1 | 4/2005 | Huffman et al. |
| 6,918,156 B2 | 7/2005 | Joo et al. |
| 6,918,603 B2 | 7/2005 | Boyd |
| 6,941,614 B2 | 9/2005 | Montgomery |
| 6,945,261 B2 | 9/2005 | Wadsworth et al. |
| 6,948,527 B2 | 9/2005 | Ragner et al. |
| 6,981,338 B2 | 1/2006 | Jensen et al. |
| 7,025,835 B2 | 4/2006 | Pedlar et al. |
| 7,028,925 B2 | 4/2006 | Guest et al. |
| 7,041,029 B2 | 5/2006 | Fulghum et al. |
| 7,048,805 B2 | 5/2006 | Kent et al. |
| 7,055,201 B2 | 6/2006 | Buchegger et al. |
| 7,059,004 B2 | 6/2006 | Mitchell et al. |
| D525,000 S | 7/2006 | Williams et al. |
| 7,113,847 B2 | 9/2006 | Chmura et al. |
| D533,320 S | 12/2006 | Pedlar |
| D536,146 S | 1/2007 | Pedlar |
| D536,842 S | 2/2007 | Pedlar |
| D536,843 S | 2/2007 | Pedlar |
| D536,844 S | 2/2007 | Pedlar |
| D536,845 S | 2/2007 | Pedlar |
| D536,846 S | 2/2007 | Pedlar |
| D538,492 S | 3/2007 | Pedlar |
| D542,988 S | 5/2007 | Dammkoehler et al. |
| D543,323 S | 5/2007 | Pedlar |
| D544,659 S | 6/2007 | Auerswald et al. |
| D549,405 S | 8/2007 | Dammkoehler |
| 7,287,299 B2 | 10/2007 | Joynt |
| 7,302,734 B2 | 12/2007 | Nowak et al. |
| 7,328,758 B2 | 2/2008 | Ruffo |
| 7,350,264 B2 | 4/2008 | Bedard et al. |
| D569,057 S | 5/2008 | Goff |
| 7,370,386 B2 | 5/2008 | Lehman et al. |
| D571,512 S | 6/2008 | Dammkoehler et al. |
| 7,406,739 B2 | 8/2008 | Guest et al. |
| 7,430,782 B2 | 10/2008 | Ruffo |
| 7,533,435 B2 | 5/2009 | Pedlar et al. |
| 7,555,801 B2 | 7/2009 | Peters et al. |
| 7,611,555 B2 | 11/2009 | Wattenberg et al. |
| 7,712,181 B2 | 5/2010 | Riach |
| 7,841,042 B2 | 11/2010 | Roden et al. |
| 7,920,941 B2 | 4/2011 | Park et al. |
| 8,002,862 B2 | 8/2011 | Schultink |
| D654,234 S | 2/2012 | Hein |
| D659,308 S | 5/2012 | Dammkoehler |
| D661,853 S | 6/2012 | Dammkoehler |
| 8,245,345 B2 | 8/2012 | Pedlar et al. |
| 8,261,759 B2 | 9/2012 | Kelle et al. |
| 8,302,240 B2 | 11/2012 | Tucker et al. |
| 8,397,333 B2 | 3/2013 | Tucker et al. |
| 8,438,685 B2 | 5/2013 | Pedlar et al. |
| 8,528,142 B1 | 9/2013 | Pedlar et al. |
| D693,529 S | 11/2013 | Garner |
| 8,887,340 B2 | 11/2014 | Pedlar et al. |
| 8,924,019 B2 | 12/2014 | Tang |
| 9,015,887 B1 | 4/2015 | Pedlar et al. |
| D734,573 S | 7/2015 | Dammkoehler |
| 9,192,276 B2 | 11/2015 | Pedlar et al. |
| D750,988 S | 3/2016 | Goldring |
| D751,435 S | 3/2016 | Goldring |
| 9,451,861 B2 | 9/2016 | Pedlar et al. |
| 9,510,721 B2 | 12/2016 | Pedlar et al. |
| D785,254 S | 4/2017 | Dammkoehler et al. |
| 9,629,514 B2 | 4/2017 | Hillen et al. |
| D793,635 S | 8/2017 | Dammkoehler et al. |
| 9,730,566 B2 | 8/2017 | Pedlar et al. |
| 9,757,005 B2 | 9/2017 | Pedlar et al. |
| 10,010,231 B2 | 7/2018 | Knutson et al. |
| 2001/0002500 A1 | 6/2001 | Kasen et al. |
| 2003/0159225 A1 | 8/2003 | Kuo |
| 2003/0192963 A1 | 10/2003 | Ebberts |
| 2004/0040102 A1 | 3/2004 | Field et al. |
| 2004/0172769 A1 | 9/2004 | Giddings et al. |
| 2004/0187895 A1 | 9/2004 | Field et al. |
| 2004/0221407 A1 | 11/2004 | Field et al. |
| 2004/0226578 A1 | 11/2004 | Guest et al. |
| 2004/0226584 A1 | 11/2004 | Guest et al. |
| 2004/0262871 A1 | 12/2004 | Schreuder et al. |
| 2005/0081319 A1 | 4/2005 | Legatt |
| 2005/0166354 A1 | 8/2005 | Uehigashi |
| 2005/0251937 A1 | 11/2005 | Ruffo |
| 2006/0064844 A1 | 3/2006 | Venard et al. |
| 2006/0124770 A1 | 6/2006 | Vernard et al. |
| 2006/0156498 A1 | 7/2006 | Vernard et al. |
| 2006/0184293 A1 | 8/2006 | Konandreas et al. |
| 2006/0236494 A1 | 10/2006 | Nelson et al. |
| 2007/0209143 A1 | 9/2007 | Choi et al. |
| 2007/0240276 A1 | 10/2007 | Pedlar et al. |
| 2008/0151233 A1* | 6/2008 | Blanke ............... G01N 21/8806 |
| | | 356/237.2 |
| 2011/0004339 A1 | 1/2011 | Ozick et al. |
| 2011/0023918 A1 | 2/2011 | Kelle et al. |
| 2012/0096671 A1 | 4/2012 | Venard et al. |
| 2013/0005224 A1 | 1/2013 | Leifheit et al. |
| 2013/0261867 A1 | 10/2013 | Burnett et al. |
| 2014/0166047 A1* | 6/2014 | Hillen ...................... A47L 9/30 |
| | | 15/49.1 |
| 2014/0188325 A1 | 7/2014 | Johnson et al. |
| 2015/0289743 A1* | 10/2015 | Taoka .................. G05D 1/0297 |
| | | 701/2 |
| 2015/0327742 A1* | 11/2015 | Strang ................. G01N 21/251 |
| | | 15/49.1 |
| 2016/0238449 A1 | 8/2016 | Goldring et al. |
| 2016/0290863 A1 | 10/2016 | Goldring et al. |
| 2016/0299061 A1 | 10/2016 | Goldring et al. |
| 2017/0049287 A1* | 2/2017 | Knutson ............... A47L 11/201 |
| 2017/0164804 A1 | 6/2017 | Dickrell et al. |
| 2017/0164805 A1 | 6/2017 | Ickes et al. |
| 2017/0340183 A1 | 11/2017 | Pedlar et al. |
| 2017/0360270 A1 | 12/2017 | Dickrell et al. |
| 2018/0110390 A1 | 4/2018 | Pedlar et al. |
| 2018/0164213 A1* | 6/2018 | Windorfer ............. A47L 9/2805 |
| 2018/0199781 A1* | 7/2018 | Hillen ................. G01N 21/4738 |

FOREIGN PATENT DOCUMENTS

| | | |
|---|---|---|
| CA | 2242793 | 7/1998 |
| CA | 2268234 | 10/1999 |
| CN | 300856004 | 12/2008 |
| CN | 201543633 | 8/2010 |
| CN | 102613944 | 8/2012 |
| CN | 105078375 | 11/2015 |
| CN | 106163360 | 11/2016 |
| DE | 1023867 | 2/1958 |
| DE | 1270066 | 6/1968 |
| DE | 1658384 | 4/1971 |
| DE | 7703475 | 6/1977 |
| DE | 69011648 | 12/1994 |
| DE | 4440202 | 5/1995 |
| DE | 9421472 | 1/1996 |
| DE | 4429996 | 2/1996 |
| DE | 9421625 | 3/1996 |
| DE | 19539350 | 4/1997 |
| DE | 19745887 | 8/1998 |
| DE | 19851681 | 5/2000 |
| DE | 19851666 | 9/2000 |
| DE | 69608989 | 11/2000 |
| DE | 19927593 | 4/2001 |
| DE | 10029691 | 1/2002 |

(56) References Cited

FOREIGN PATENT DOCUMENTS

| | | |
|---|---|---|
| DE | 10030725 | 1/2002 |
| DE | 10062329 | 7/2002 |
| DE | 20204485 | 10/2002 |
| DE | 10142192 | 3/2003 |
| DE | 10204118 | 10/2003 |
| DE | 10218244 | 11/2003 |
| DE | 10221349 | 11/2003 |
| DE | 10221351 | 11/2003 |
| DE | 10221352 | 11/2003 |
| DE | 10307150 | 9/2004 |
| DE | 10324825 | 12/2004 |
| DE | 10324826 | 12/2004 |
| DE | 112010002823 | 7/2012 |
| DE | 102013113426 | 6/2014 |
| DE | 102015104250 | 9/2016 |
| DE | 102015112174 | 2/2017 |
| EP | 0017913 | 10/1980 |
| EP | 0176696 | 4/1986 |
| EP | 0176697 | 4/1986 |
| EP | 0189617 | 8/1986 |
| EP | 0281976 | 9/1988 |
| EP | 0282850 | 9/1988 |
| EP | 0283022 | 9/1988 |
| EP | 0421194 | 4/1991 |
| EP | 0569430 | 11/1993 |
| EP | 0621004 | 10/1994 |
| EP | 0792615 | 9/1997 |
| EP | 0867331 | 9/1998 |
| EP | 0948928 | 10/1999 |
| EP | 0951857 | 10/1999 |
| EP | 1023867 | 8/2000 |
| EP | 1108091 | 6/2001 |
| EP | 1108092 | 6/2001 |
| EP | 1164074 | 12/2001 |
| EP | 1260129 | 11/2002 |
| EP | 1335869 | 8/2003 |
| EP | 1265713 | 2/2004 |
| EP | 1677099 | 12/2004 |
| EP | 1604605 | 12/2005 |
| EP | 3199009 | 8/2017 |
| FR | 2224340 | 10/1974 |
| GB | 1112147 | 5/1968 |
| GB | 2338686 | 12/1999 |
| JP | H04-264903 | 9/1992 |
| JP | H07-47039 | 2/1995 |
| JP | H08-182638 | 7/1996 |
| JP | H08-196496 | 8/1996 |
| JP | H09-94201 | 4/1997 |
| JP | 2000-217759 | 8/2000 |
| JP | 2001-258807 | 9/2001 |
| JP | 2002-078650 | 3/2002 |
| JP | 2003-246237 | 9/2003 |
| JP | 2003-504095 | 9/2003 |
| JP | 2005-324020 | 11/2005 |
| KR | 10-2011-0010329 | 2/2011 |
| WO | WO 86/01240 | 2/1986 |
| WO | WO 86/02394 | 4/1986 |
| WO | WO 89/06624 | 7/1989 |
| WO | WO 90/10416 | 9/1990 |
| WO | WO 92/013480 | 8/1992 |
| WO | WO 97/15730 | 5/1997 |
| WO | WO 97/15731 | 5/1997 |
| WO | WO 00/28149 | 5/2000 |
| WO | WO 00/74549 | 12/2000 |
| WO | WO 00/79058 | 12/2000 |
| WO | WO 01/05216 | 1/2001 |
| WO | WO 01/41935 | 6/2001 |
| WO | WO 02/42184 | 5/2002 |
| WO | WO 2005/079468 | 9/2005 |
| WO | WO 2006/121783 | 11/2006 |
| WO | WO 2016/045593 | 3/2016 |
| WO | WO 2016/063284 | 4/2016 |
| WO | WO 2016/125164 | 8/2016 |
| WO | WO 2016/125165 | 8/2016 |
| WO | WO 2016/162865 | 10/2016 |
| WO | WO 2017/031364 | 2/2017 |
| WO | WO 2017/031365 | 2/2017 |

OTHER PUBLICATIONS

"Global Industrial Electric Auto Floor Scrubber 20" Cleaning Path—Corded," Global Industrial, 2017, retrieved from https://www.globalindustrial.com/p/janitorial-maintenance/floor-care/scrubbers/global-8482-electric-auto-floor-scrubber-20-cleaning-path-corded, 9 pages.

"Kärcher B 80 W Roller Scrubber Drier," Swish Professional Cleaning Products, 2015, retrieved from https://www.swishclean.com/product.htm?Product=95128850&Source=Category&Category=16_EQUIPMENT, 3 pages.

90/013028, Nov. 12, 2014, Reexam Certificate Issued for U.S. Pat. No. 7,533,435.

90/013,026, Dec. 19, 2014, Reexam Certificate Issued for U.S. Pat. No. 8,528,142.

U.S. Appl. No. 29/677,963, filed Jan. 24, 2019, Bearup et al.

"Adgressor™ Scrubber Models BR 850S, 850CS, 950S, 950CS, BR 105OS, 1050CS," Instructions for Use, Nilfisk Advance, 2004, 29 pages in multiple parts.

"Adgressor™ Scrubber Models BR 850S, 850CS, 950S, 950CS, BR 105OS, 1050CS," Parts List, Nilfisk Advance, 2004, 69 pages in multiple parts.

"Adgressor™ Scrubber Models BR 850S, 850CS, 950S, 950CS, BR 105OS, 1050CS," Service Manual Nilfisk Advance, 2006, 82 pages in multiple parts.

"Drawing closer to people combining robot technology and AI (expressing emotions)," Fujitsu, 2017, 3 pages [retrieved online from: www.fujitsu.com/global/about/resources/featurestories/2017101801.html].

"Minny 16," FIMAP, Italian Customized Cleaning, 2007, 8 pages.

"Mobile robots tackle the world," Design News, Feb. 25, 1991, pp. 21-22.

Operating Instructions Manual for the Galopio Sweeping Machine identified as 'Galopio.1, Listen-Nr. 1014691-4', dated Oct. 7, 2002, (Galopio 2002), with certified translation dated Sep. 27, 2013, 179 pages.

"Powertech Automated Hard Floor Cleaning System," Windsor Industries, 1991, 10 pages.

"RoboScrub Operator's Manual," Windsor Industries, 1991, 26 pages.

"Schmidt Produkte: Kleinkehrfahrzeug GALOPIO", Photo of Galopio device, available at http://database.schmidtgroup.net/loader.php//en/schmidt/swk/products/00011/picture1.html, as early as Apr. 29, 2003, printed on Jan. 29, 2007, p. 1.

"Schmidt Produkte: Kleinkehrfahrzeug GALOPIO", Photo of Galopio device, available at http://database.schmidtgroup.net/loader.php/de/schmidt/swk/00011/, as early as May 29, 2003, printed on Jan. 29, 2007, p. 1.

"Taski Swingo XP Scrubber," Brochure, Johnson Diversey, 2007, 7 pages in multiple parts.

"The Autonomous Vacuum Cleaning Robot," Appliance, Mar. 1991, pp. 55-56.

"The Science of Floor Care: Profi™ Rubber Floor Cleaner/Degreaser," Taski, http://www.johnsondiversey.com/Cultures/en-US-OpCo/Products+and+Systems/Categori . . . , accessed Nov. 12, 2008, 2 pages.

"Tomorrow's Technologies: A Look Ahead at Showtime," Modern Plastics, May 1991, pp. 55-58.

"User Interface for Scrubber/Vacuum Robots," Windsor Industries, 1990, 23 pages.

Allied Sweepers 400 Series Specs., May 1998, 1 page.

Amended Answer and Counterclaims of Defendant *Nilfisk-Advance, Inc., Kärcher North America, Inc.*, v. *Nilfisk-Advance, Inc.*, United States District Court for the District of Colorado, Case No. 1:13-cv-01284-CMA-MJW, filed Jul. 12, 2013, 13 pages.

Amended Declaration of Tyler L. Nasiedlak in Opposition To Kärcher North America, Inc.'s First Motion for Preliminary Injunction, (dated Nov. 21, 2013), *Kärcher North America, Inc.*, v.

(56) References Cited

OTHER PUBLICATIONS

*Nilfisk-Advance, Inc.*, United States District Court for the District of Colorado, Case No. 1:13-cv-01284-CMA-MJW, filed Nov. 21, 2013, 637 pages. (Uploaded in 3 parts).
American-Lincoln Encore Scrubber, Operator's Manual & Parts List, American-Lincoln, 1998, 43 pages in multiple parts.
Answer and Counterclaims of Defendant Nilfisk-Advance, Inc., *Kärcher North America, Inc.*, v. *Nilfisk-Advance, Inc.*, United States District Court for the District of Colorado, Case No. 1:13-cv-01284-CMA-MJW, filed May 31, 2013, 12 pages.
Complaint With Jury Demand, *Karcher North America, Inc.*, v. *Nilfisk-Advance, Inc.*, United States District Court for the District of Colorado, Case No. 1:13-cv-01284, filed May 16, 2013, 147 pages.
Declaration of Christopher R. Smith in Opposition To Kärcher North America, Inc.'s Motion for Preliminary Injunction, (dated Aug. 16, 2013), *Kärcher North America, Inc.*, v. *Nilfisk-Advance, Inc.*, United States District Court for the District of Colorado, Case No. 1:13-cv-01284-CMA-MJW, filed Aug. 16, 2013, 148 pages.
Declaration of Christopher R. Smith in Opposition To Kärcher North America, Inc.'s Second Motion for Preliminary Injunction, (dated Nov. 4, 2013), *Kärcher North America, Inc.*, v. *Nilfisk-Advance, Inc.*, United States District Court for the District of Colorado, Case No. 1:13-cv-01284-CMA-MJW, filed Nov. 4, 2013, 374 pages.
Declaration of Christopher R. Smith in Support of Nilfisk-Advance's Motion To Stay Litigation Pending Patent Reexaminations, (dated Oct. 22, 2013), *Kärcher North America, Inc.*, v. *Nilfisk-Advance, Inc.*, United States District Court for the District of Colorado, Case No. 1:13-cv-01284-CMA-MJW, filed Oct. 22, 2013, 333 pages.
Declaration of Craig W. Mueller in Support of Kärcher North America, Inc.'s Motion for Preliminary Injunction, (dated Sep. 3, 2013), *Kärcher North America, Inc.*, v. *Nilfisk-Advance, Inc.*, United States District Court for the District of Colorado, Case No. 1:13-cv-01284-CMA-MJW, filed Sep. 3, 2013, 193 pages.
Declaration of David B. Kellis in Support of Kärcher North America, Inc.'s Motion for Preliminary Injunction, (dated Jul. 26, 2013), *Kärcher North America, Inc.*, v. *Nilfisk-Advance, Inc.*, United States District Court for the District of Colorado, Case No. 1:13-cv-01284-CMA-MJW, filed Jul. 26, 2013, 107 pages.
Declaration of David B. Kellis in Support of Kärcher North America, Inc.'s Opposition to Stay Pending Patent Reexaminations and Reply in Further Support of Second Motion for Preliminary Injunction, *Kärcher North America, Inc.*, v. *Nilfisk-Advance, Inc.*, United States District Court for the District of Colorado, Case No. 1:13-cv-01284-CMA-MJW, filed Nov. 21, 2013, 12 pages.
Declaration of David Wood in Opposition To Kärcher North America, Inc.'s Motion for Preliminary Injunction, (dated Aug. 16, 2013), *Kärcher North America, Inc.*, v. *Nilfisk-Advance, Inc.*, United States District Court for the District of Colorado, Case No. 1:13-cv-01284-CMA-MJW, filed Aug. 16, 2013, 94 pages.
Declaration of David Wood in Opposition To Kärcher North America, Inc.'s Second Motion for Preliminary Injunction, (dated Nov. 4, 2013), *Kärcher North America, Inc.*, v. *Nilfisk-Advance, Inc.*, United States District Court for the District of Colorado, Case No. 1:13-cv-01284-CMA-MJW, filed Nov. 4, 2013, 70 pages.
Declaration of David Wood in Support of Nilfisk-Advance, Inc.'s Motion for a Stay, (dated Dec. 9, 2013), *Kärcher North America, Inc.*, v. *Nilfisk-Advance, Inc.*, United States District Court for the District of Colorado, Case No. 1:13-cv-01284-CMA-MJW, filed Dec. 9, 2013, 45 pages.
Declaration of Elliot Younessian in Support of Kärcher North America, Inc.'s Motion for Preliminary Injunction, (dated Jul. 17, 2013), *Kärcher North America, Inc.*, v. *Nilfisk-Advance, Inc.*, United States District Court for the District of Colorado, Case No. 1:13-cv-01284-CMA-MJW, filed Jul. 26, 2013, 147 pages.
Declaration of Gary Ellertson, (dated Nov. 19, 2013), *Kärcher North America, Inc.*, v. *Nilfisk-Advance, Inc.*, United States District Court for the District of Colorado, Case No. 1:13-cv-01284-CMA-MJW, filed Nov. 21, 2013, 3 pages.

Declaration of Tyler L. Nasiedlak in Opposition To Kärcher North America, Inc.'s Motion for Preliminary Injunction, (dated Aug. 16, 2013), *Kärcher North America, Inc.*, v. *Nilfisk-Advance, Inc.*, United States District Court for the District of Colorado, Case No. 1:13-cv-01284-CMA-MJW, filed Aug. 16, 2013, 517 pages.
Declaration of Tyler L. Nasiedlak in Opposition To Kärcher North America, Inc.'s Second Motion for Preliminary Injunction, (dated Nov. 4, 2013), *Kärcher North America, Inc.*, v. *Nilfisk-Advance, Inc.*, United States District Court for the District of Colorado, Case No. 1:13-cv-01284-CMA-MJW, filed Nov. 4, 2013, 232 pages.
Declaration of Wade Reitmeier in Support of Defendant Nilfisk-Advance, Inc.'s Reponse to Motion for Preliminary Injunction, (dated Aug. 16, 2013), *Kärcher North America, Inc.*, v. *Nilfisk-Advance, Inc.*, United States District Court for the District of Colorado, Case No. 1:13-cv-01284-CMA-MJW, filed Aug. 16, 2013, 23 pages.
Defendant Nilfisk-Advance, Inc.'s Motion To Stay Litigation Pending Patent Reexaminations and Memorandum in Support, *Kärcher North America, Inc.*, v. *Nilfisk-Advance, Inc.*, United States District Court for the District of Colorado, Case No. 1:13-cv-01284-CMA-MJW, filed Oct. 22, 2013, 15 pages.
Defendant's Invalidity Contentions, *Kärcher North America, Inc.*, v. *Nilfisk-Advance, Inc.*, United States District Court for the District of Colorado, Case No. 1:13-cv-01284-CMA-MJW, dated Dec. 2, 2013, 481 pages.
Defendant's Reply Brief in Support of Its Motion To Stay Litigation Pending Patent Reexaminations, *Kärcher North America, Inc.*, v. *Nilfisk-Advance, Inc.*, United States District Court for the District of Colorado, Case No. 1:13-cv-01284-CMA-MJW, filed Dec. 9, 2013, 11 pages.
Exhibit a of Notice of Defendant Nilfish-Advance, Inc.'s Compliance With D.C.COLO.LPtR 8 and 9 and Invalidity Contentions, (dated Mar. 27, 2015), *Kärcher North America, Inc.*, v. *Nilfisk-Advance, Inc.*, United States District Court for the District of Colorado, Case No. 1:13-cv-01284-CMA-MJW, 120 pages.
Exhibit B of Notice of Defendant Nilfish-Advance, Inc.'s Compliance With D.C.COLO.LPtR 8 and 9 and Invalidity Contentions, (dated Mar. 27, 2015), *Kärcher North America, Inc.*, v. *Nilfisk-Advance, Inc.*, United States District Court for the District of Colorado, Case No. 1:13-cv-01284-CMA-MJW, 73 pages.
Exhibit C of Notice of Defendant Nilfish-Advance, Inc.'s Compliance With D.C.COLO.LPtR 8 and 9 and Invalidity Contentions, (dated Mar. 27, 2015), *Kärcher North America, Inc.*, v. *Nilfisk-Advance, Inc.*, United States District Court for the District of Colorado, Case No. 1:13-cv-01284-CMA-MJW, 11 pages.
Fantomat Sale Sheet, BUZILI-WERK Wagner GmbH & Co., date unknown.
First Amended Complaint With Jury Demand, *Karcher North America, Inc.*, v. *Nilfisk-Advance, Inc.*, United States District Court for the District of Colorado, Case No. 1:13-cv-01284-CMA-MJW, filed Sep. 25, 2013, 151 pages.
Galopio Cleaning Device, www.schmidt-holding.com, accessed Feb. 23, 2005, 4 pages.
Galopio Operating Instructions, Schmidt Winterdienst-Und Kommunaltechnik, Jan. 17, 2005, Issue 5, pp. 1-84.
Hefter Cleantech, Convert 82, May 19, 2006, 3 pages, accessed Jun. 1, 2007.
Kärcher, MC600 Multicleaner Brochure, date unknown, 2 pages.
Kärcher, MC600 Multicleaner Brochure, date unknown, 4 pages.
Kärcher, Multicleaner MC 600, Mar. 1990, 7 pages.
Kärcher, Multicleaner MC600 Manual, date unknown, 44 pages.
Kärcher, NT301 Brochure, date unknown, 2 pages.
Kärcher, Worldwide Cleaning Expertise Programme 91/92, published more than one year prior to the filing date of U.S. Pat. No. 6,425,958, which was filed Feb. 2001, 50 pages.
Madvac PS300 Brochure, Feb. 2004, 4 pages.
Moravec, "Caution! Robot Vehicle!," Carnegie Mellon University, 1991, 15 pages.
Nilfisk-Advance Product Catalog, 2004, 6 pages in multiple parts.
Nilfisk-Advance, Inc.'s Memorandum in Opposition To Kärcher North America, Inc.'s Motion for Preliminary Injunction, *Kärcher North America, Inc.*, v. *Nilfisk-Advance, Inc.*, United States District

(56) References Cited

OTHER PUBLICATIONS

Court for the District of Colorado, Case No. 1:13-cv-01284-CMA-MJW, filed Aug. 16, 2013, 16 pages.
Nilfisk-Advance, Inc.'s Memorandum in Opposition To Kärcher North America, Inc.'s Second Motion for Preliminary Injunction, *Kärcher North America, Inc.*, v. *Nilfisk-Advance, Inc.*, United States District Court for the District of Colorado, Case No. 1:13-cv-01284-CMA-MJW, filed Nov. 4, 2013, 17 pages.
Nobles Typhoon 161OP/1612 Wet/Dry Vacuum Operator and Parts Manual, Jan. 2000, 22 pages Kaivac, Inc.
Notice of Defendant Nilfish-Advance, Inc.'s Compliance With D.C.COLO.LPtR 8 and 9 and Invalidity Contentions, (dated Mar. 27, 2015), *Kärcher North America, Inc.*, v. *Nilfisk-Advance, Inc.*, United States District Court for the District of Colorado, Case No. 1:13-cv-01284-CMA-MJW, 2 pages.
No-Touch Cleaning Brochure, Kaivac, Inc., dated 2003, 8 pages.
Nov. 15, 2013 Declaration of Elliot Younessian, *Kärcher North America, Inc.*, v. *Nilfisk-Advance, Inc.*, United States District Court for the District of Colorado, Case No. 1:13-cv-01284-CMA-MJW, filed Nov. 21, 2013, 13 pages.
Nov. 21, 2013 Declaration of Craig W. Mueller, *Karcher North America, Inc.*, v. *Nilfisk-Advance, Inc.*, United States District Court for the District of Colorado, Case No. 1:13-cv-01284-CMA-MJW, filed Nov. 21, 2013, 102 pages.
Nov. 21, 2013 Declaration of Jeffrey J. Rogers, *Kärcher North America, Inc.*, v. *Nilfisk-Advance, Inc.*, United States District Court for the District of Colorado, Case No. 1:13-cv-01284-CMA-MJW, filed Nov. 21, 2013, 117 pages.
Oct. 2, 2013 Declaration of Elliot Younessian in Support of Kärcher North America, Inc.'s Second Motion for Preliminary Injunction, *Kärcher North America, Inc.*, v. *Nilfisk-Advance, Inc.*, United States District Court for the District of Colorado, Case No. 1:13-cv-01284-CMA-MJW, filed Oct. 9, 2013, 61 pages.
O'Rourke et al., "Future Spies Could Be Tireless, Fearless And Drink Diesel," Howard County Sun, Jan. 20, 1991, p. 1B.
Photo and information related to Galopio device sold on Mascus website, available at http://www.mascus.com/product_card.asp?br=Broddway&catn=Groundscare&page=1&location=EN&pr . . . , indicates that device was registered in 2000, printed on Jan. 29, 2007, p. 1.
Photo of Galopio device, available at http://www.bassewitz.de/fahrzeuge/schmidt.htm, as early as Jan. 26, 2002, printed on Jan. 29, 2007, pp. 1-2.
Photos of Galopio Sweeping Machine, identified as being manufactured in 1999, (provided by 3rd Party Requestor in U.S. Patent Reexamination Control Nos. 90/013,028 and 90/013,028), 7 pages.
Plaintiff Kärcher North America, Inc.'s Motion for Preliminary Injunction and Memorandum in Support Thereof, *Kärcher North America, Inc.*, v. *Nilfisk-Advance, Inc.*, United States District Court for the District of Colorado, Case No. 1:13-cv-01284-CMA-MJW, filed Jul. 26, 2013, 16 pages.
Plaintiff Kärcher North America, Inc.'s Reply in Further Support of Motion for Preliminary Injunction, *Kärcher North America, Inc.*, v. *Nilfisk-Advance, Inc.*, United States District Court for the District of Colorado, Case No. 1:13-cv-01284-CMA-MJW, filed Sep. 3, 2013, 11 pages.
Plaintiff Kärcher North America, Inc.'s Second Motion for Preliminary Injunction and Memorandum in Support Thereof, *Kärcher North America, Inc.*, v. *Nilfisk-Advance, Inc.*, United States District Court for the District of Colorado, Case No. 1:13-cv-01284-CMA-MJW, filed Oct. 9, 2013, 14 pages.
Print out of Kaivac No-Touch Clean System, www.Kaivac.com, dated Jan. 23, 2003, 3 pages.
Print out of Nilfisk Aquatron 8 machine, www.mn.nilfisk-advance.com, dated Jan. 30, 2003, 1 page.
Reply in Further Support of Second Motion for Preliminary Injunction, *Kärcher North America, Inc.*, v. *Nilfisk-Advance, Inc.*, United States District Court for the District of Colorado, Case No. 1:13-cv-01284-CMA-MJW, filed Nov. 21, 2013, 11 pages.

Second Amended Answer and Counterclaims of Defendant Nilfisk-Advance, Inc., *Kärcher North America, Inc.*, v. *Nilfisk-Advance, Inc.*, United States District Court for the District of Colorado, Case No. 1:13-cv-01284-CMA-MJW, filed Oct. 9, 2013, 13 pages.
Second Declaration of Christopher R. Smith in Support of Nilfisk-Advance's Motion to Stay Litigation Pending Patent Reexaminations, (dated Dec. 9, 2013), *Kärcher North America, Inc.*, v. *Nilfisk-Advance, Inc.*, United States District Court for the District of Colorado, Case No. 1:13-cv-01284-CMA-MJW, filed Dec. 9, 2013, 41 pages.
Sep. 3, 2013 Declaration of Elliot Younessian in Further Support of Motion for Preliminary Injunction, *Kärcher North America, Inc.*, v. *Nilfisk-Advance, Inc.*, United States District Court for the District of Colorado, Case No. 1:13-cv-01284-CMA-MJW, filed Sep. 3, 2013, 235 pages.
Service Master, Boss 2000B Manual, Oct. 1995, 42 pages.
Service Master, Boss 2000E Manual, Aug. 1997, 32 pages.
Service Master, Boss 2000LE Manual, Mar. 1998, 30 pages.
Street Cleaning device shown on www.onyx-environment.com, accessed May 7, 2004, 1 page.
Tennant Model 1465 and 1480 Manual, 1988, pp. 3-18 and 6-34.
Warning: Your Competitor has a KaiVac, Sep. 1998, 10 pages.
Alves-Oliveira et al. "Meet Me Halfway: Eye Behaviour as an Expression of Robot's Language," AAAI Fall Symposium Series, 2014, pp. 13-15.
Baraka et al. "Expressive Lights for Revealing Mobile Service Robot State," Proc. Of AAAI 2015 Fall Symposium on AI-HRI, 2015, pp. 17-23.
Baraka "Effective Non-Verbal Communication for Mobile Robots using Expressive Lights," The Robotics Institute Carnegie Mellon University, Pittsburgh, Pennsylvania, Master's Thesis, May 2016, 82 pages.
Benayad-Cherif et al., "Mobile Robot Navigation Sensors," Submitted to the Conference Mobile Robots VII at OE/Technology, 1992, abstract only, 1 page.
Bethel "Robots without faces: Non-verbal social human-robot interaction," University of South Florida, Graduate Theses and Dissertations, 2009, 183 pages [found online at: scholarcommons.usf.edu/etd/1855/].
Bright "Emergency Vehicle LED Lighting: Friend of Foe?" American Public University, Master's Capstone Thesis, Aug. 2014, 76 pages.
Cominelli et al. "SEAI: Social Emotional Artificial Intelligence Based on Damasio's Theory of Mind," Frontiers in Robotics and AI, Feb. 2018, vol. 5, Article 6, 20 pages.
Costa et al. "Emotional Storytelling using Virtual and Robotic Agents," International Journal of Humanoid Robotics, Mar. 2018, vol. 15, No. 3, 1850006, 14 pages.
Cuculo et al. "The color of smiling: computational synaesthesia of facial expressions," Image Analysis and Processing, ICIAP 2015, 2015, pp. 203-214.
De Lorenzo et al. "Lights and Siren: A Review of Emergency Vehicle Warning Systems," Annals of Emergency Medicine, Dec. 1991, vol. 20, No. 12, pp. 1331-1335.
Feldmaier et al. "Evaluation of a RGB-LED-based Emotion Display for Affective Agents," arXiv, Dec. 2016, 6 pages.
Kupas "Lights and Siren Use by Emergency Medical Services (EMS): Above All Do No Harm," U.S. Department of Transportation National Highway Traffic Safety Administration Office of Emergency Medical Services (EMS), May 2017, 98 pages.
National Association of Emergency Medical Services Physicians (NAEMSP) et al. "Use of Warning Lights and Siren in Emergency Medical Vehicle Response and Patient Transport," Prehospital and Disaster Medicine, Apr.-Jun. 1994, 10 pages.
Senart et al. "Modelling an Emergency Vehicle Early-Warning System using Real-time Feedback," International Journal of Intelligent Information and Database Systems, 2008, vol. 2, No. 2, pp. 222-239.
Sert, "Robot Engine: Rapid Product Development Path," Submitted to the Conference Mobile Robots VII at OE/Technology, 1992, abstract only, 1 page.

(56) References Cited

OTHER PUBLICATIONS

Song et al. "Expressing Emotions through Color, Sound, and Vibration with an Appearance-Constrained Social Robot," The 2017 Conference on Human-Robot Interaction (HRI2017), Mar. 2017, Vienna, Austria, 10 pages.
Thomaz et al. Computational Human-Robot Interaction, Foundations and Trends in Robotics, 2013, vol. 4, No. 2-3, pp. 105-223.
Veloso et al. "CoBots: Robust Symbiotic Autonomous Mobile Service Robots," Proceedings of the Twenty-Fourth International Joint Conference on Artificial Intelligence (IJCAI 2015), 2015, pp. 4423-4429.
Veloso et al. "Transparency in Robot Autonomy," Future of Life Institute, Jan. 2017, 32 pages.

* cited by examiner

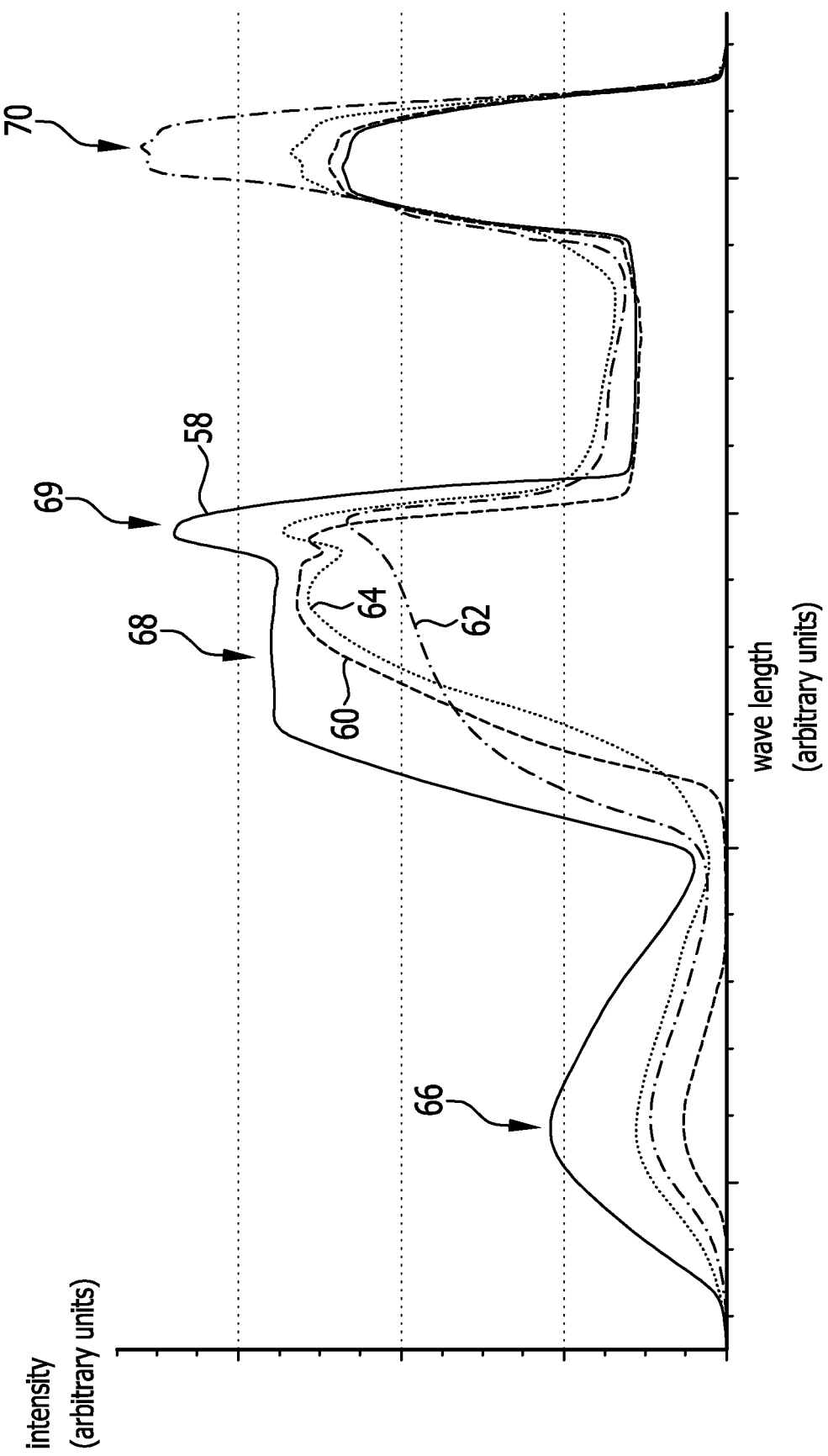

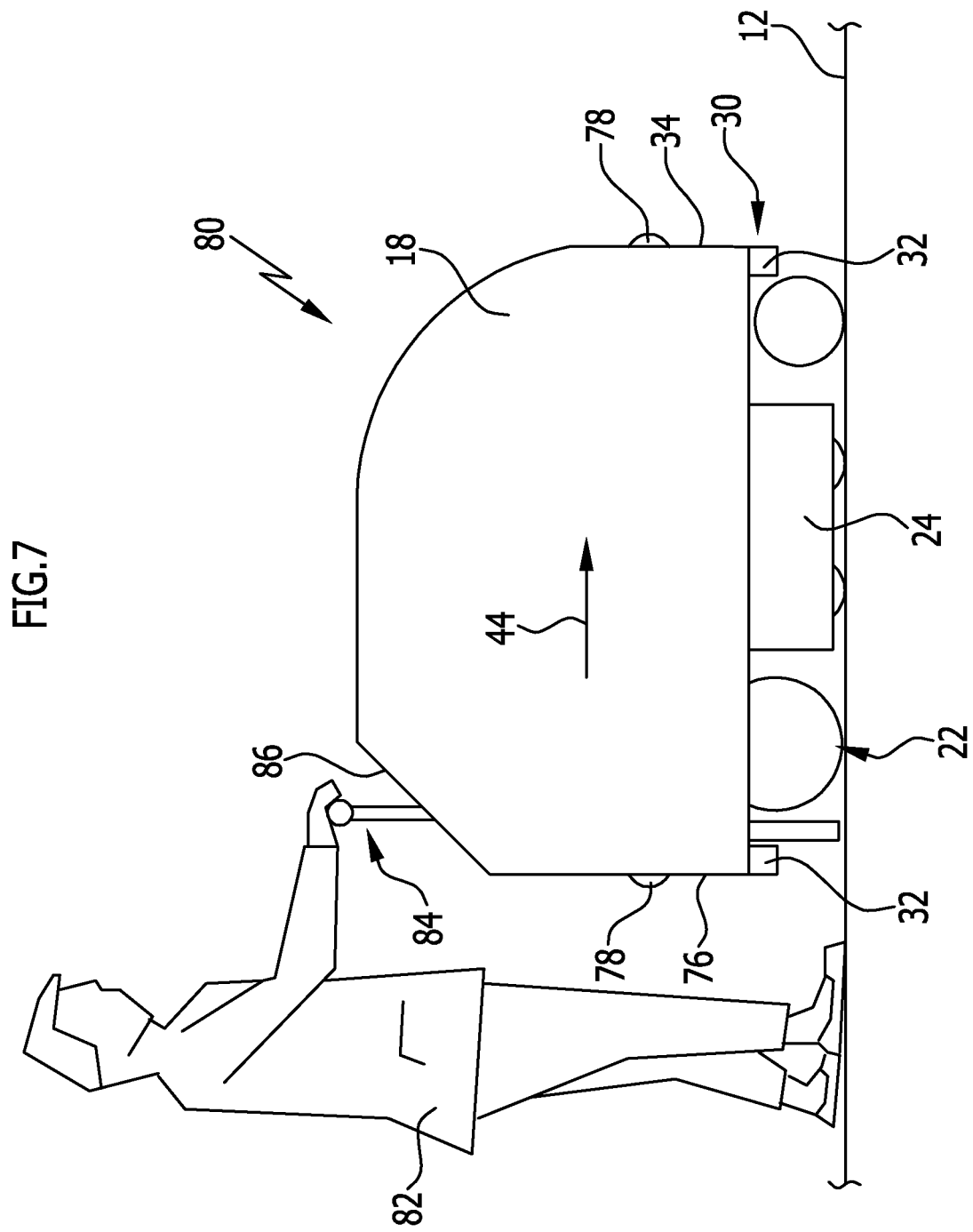

FLOOR CLEANING APPLIANCE AND METHOD FOR CLEANING A FLOOR SURFACE

CROSS-REFERENCE TO RELATED APPLICATIONS

This application is a continuation patent application of international application number PCT/EP2017/060644, filed on May 4, 2017 which is incorporated herein by reference in its entirety and for all purposes.

FIELD OF THE INVENTION

The present invention relates to a floor cleaning appliance which comprises at least one cleaning assembly for cleaning a floor surface and an optical detection device with which a floor type is determinable.

The present invention also relates to a method for cleaning a floor surface with a floor cleaning appliance.

BACKGROUND OF THE INVENTION

In floor cleaning appliances, specifically self-propelled and self-steering floor cleaning appliances for autonomously cleaning a floor surface, it is known to determine the floor type on the basis of an optical detection device. For example, DE 10 2013 113 426 A1 describes that photographic recordings of the floor surface are generated, which are evaluated by means of methods of image processing for determining the floor type. Is has been shown that a determination of the floor type by means of photographic recordings is often prone to error due to the surroundings, for example incident light and associated scattering and reflection on the floor surface.

Further floor cleaning appliances with optical detection devices are described in WO 2017/031365 A1 and in US 2005/0166354 A1. WO 2017/031364 A1 describes how it can be determined whether water remains on the floor surface after cleaning.

An object underlying the present invention is to provide a floor cleaning appliance of the kind stated at the outset and a method for floor cleaning with which/in which a reliable determination of the floor type is possible.

SUMMARY OF THE INVENTION

In a first aspect of the invention, a floor cleaning appliance comprises at least one cleaning assembly for cleaning a floor surface and an optical detection device with which a floor type is determinable. The detection device is configured as or comprises a spectroscopic device with which the floor type is determinable on the basis of a spectrum of the floor surface recorded by reflection measurement.

In a second aspect of the invention, a method for cleaning a floor surface with a floor cleaning appliance is provided, wherein a floor type is determined by means of a spectroscopic device of the floor cleaning appliance on the basis of a spectrum recorded by reflection measurement, and wherein the cleaning of the floor surface is based on the information regarding the floor type.

BRIEF DESCRIPTION OF THE DRAWINGS

The foregoing summary and the following description may be better understood in conjunction with the drawing figures, of which:

FIG. 6: shows spectra of regions of the floor surface which were obtained with the spectroscopic device of the floor cleaning appliance from FIG. 1, wherein the wavelength in arbitrary units is depicted as the abscissa and the signal strength in arbitrary units is depicted as the ordinate; and FIG. 7: shows a further preferred embodiment of a floor cleaning appliance in accordance with the invention in a schematic view, guided by an operator.

DETAILED DESCRIPTION OF PREFERRED EMBODIMENTS OF THE INVENTION

Figure 1:
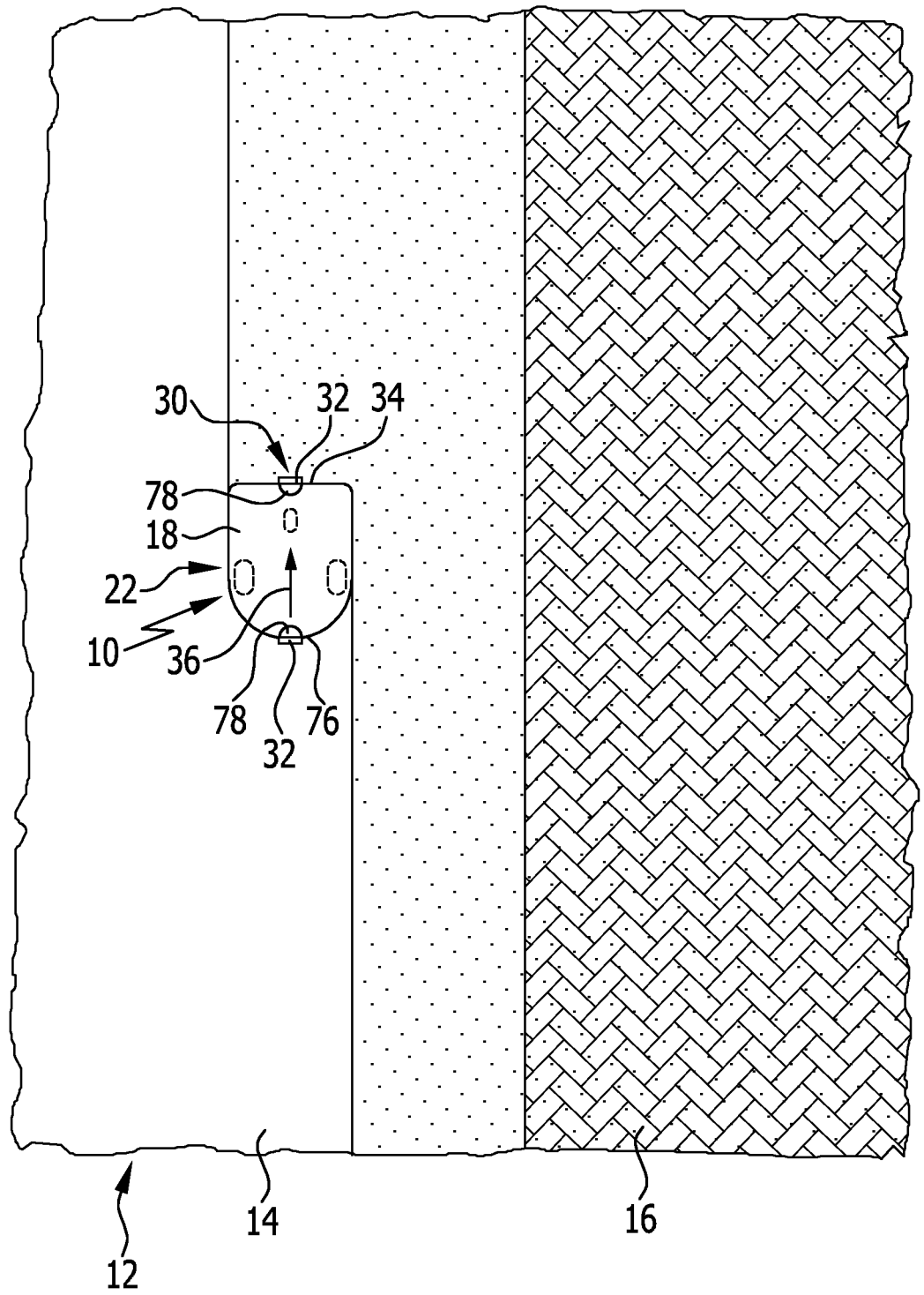
FIG. 1: shows schematically the plan view of a floor cleaning appliance in accordance with the invention in the act of cleaning a floor surface.

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a floor cleaning appliance which comprises at least one cleaning assembly for cleaning a floor surface and an optical detection device with which a floor type is determinable. The detection device is configured as or comprises a spectroscopic device with which the floor type is determinable on the basis of a spectrum of the floor surface recorded by reflection measurement.

The floor cleaning appliance in accordance with the invention allows for the floor type to be spectroscopically determined. A spectrum of the floor surface may hereby be recorded. In dependence on the intensity or signal strength as a function of a wavelength or energy or frequency of light used, a spectral signature of the different floor types may be found by means of a quantitative analysis. As a result of the spectral analysis, the determination of the floor type is largely independent of outside influences like ambient light. It has been shown in practice that a reliable determination of the floor type is possible in this way.

"By reflection measurement" presently includes the case that light directed from the spectroscopic device to the floor surface is scattered by the latter and is detected by the spectroscopic device.

The recorded spectrum of the floor surface may be calibrated with respect to wavelength and/or energy or frequency of the light. Provision may also be made for the wavelength or energy or frequency to not be calibrated and to be determined on the basis of channels (bins) of a line or field detector.

In a corresponding manner, the intensity or signal strength of the spectrum may be calibrated or not calibrated. The spectral sensitivity of a receiving element may be used for evaluating the spectrum. It is also possible for only the counts to be used in the investigation of characteristic structures of the spectrum in dependence on a predetermined wavelength or energy or frequency.

It proves to be advantageous if at least one of the following is settable by the floor cleaning appliance in dependence on the determined floor type for adapting the cleaning to the floor surface:

cleaning parameters like use and/or kind of at least one cleaning assembly, cleaning intensity, amount and/or kind of cleaning agent(s). The floor cleaning appliance may, for example, have different cleaning assemblies which are used individually or in combination with each other depending on the floor type. The cleaning intensity of at least one cleaning assembly may be set, for example the rotational speed of a cleaning brush or the suction power of a suction assembly. When at least one cleaning agent is used, for example for wetting the floor surface, the amount and/or the kind of cleaning agent may be adapted. The cleaning liquid is in particular water, though the metering of a cleaning chemical in dependence on the floor type may also take place.

travel parameters like speed of the floor cleaning appliance, route, travel pattern, bypassing or avoiding floor surface regions with a predetermined floor type. Depending on the floor type determined, the speed of the floor cleaning appliance and its route may be adapted. The travel pattern, for example a meandering pattern, a spiral pattern or the like, may be used in dependence on the floor type. When a floor type is recognized that should not be traversed by the floor cleaning appliance, the route may be adapted to bypass a floor surface region. Provision may also be made for the floor surface region with a predetermined floor type to be traversed, but for no cleaning to take place.

It is understood that the aforementioned adaptation of the cleaning to the floor surface may be used in particular in the case of a self-propelled and self-steering floor cleaning appliance for autonomously cleaning the floor surface. A control unit of a floor cleaning appliance of that kind may be a constituent part of the spectroscopic device or vice versa.

Alternatively or in addition, provision may be made for the floor cleaning appliance to be a hand-guided floor cleaning appliance that is guided by an operator (walk-behind or ride-on).

Favorably, in particular with hand-guided floor cleaning appliances, information is outputtable to a user at an indication unit regarding the floor type. The operator may adjust the floor cleaning appliance to the indication for adapting the cleaning to the floor surface and/or check possible adjustments made automatically by the floor cleaning appliance. The indication unit may be configured in particular optically as a display unit and/or acoustically as a speaker unit.

It is advantageous if, for evaluating the spectrum, characteristic features thereof are determined on the basis of at least one of the following:

occurrence of characteristic structures with predetermined energy and/or wavelength;

absolute intensity of at least one characteristic structure;

relative intensity and/or position of two or more characteristic structures to each other;

shape of at least one characteristic structure.

Preferably at least one illuminating element of the spectroscopic device is arranged on the front side floor cleaning appliance, in relation to a main movement direction thereof, for determining the floor type of a region of the floor surface arranged upstream in the main movement direction. When moving the floor cleaning appliance, the floor type on the front side or in front of the floor cleaning appliance is thereby determined. In dependence thereon, the floor cleaning appliance may be immediately adapted with respect to cleaning parameters and/or travel parameters.

In the floor cleaning appliance in accordance with the invention, it is possible to recognize the floor type by means of the spectroscopic device. For example, a floor with plastic flooring, parquet, laminate, tiling, or carpeting may be determined as a floor type.

It is favorable if the floor type is determinable by determining the floor material. The floor type is able to be inferred from the floor material determined on the basis of the spectrum. It is hereby advantageous in particular if different materials of parquet, tiling, laminate, plastic flooring, and/or carpeting are able to be differentiated from each other.

For determining the floor type, further qualities of the floor surface may be deduced on the basis of the spectrum, for example roughness or hardness on the basis of absolute intensity of a characteristic structure or relative intensity of a plurality of characteristic structures.

Information regarding the respective characteristic structures to be expected may be stored in a storage unit of the floor cleaning appliance linked to a respective floor type and in particular floor material. By comparing with the result of the evaluation, the floor type may preferably be determined unambiguously.

The spectroscopic device favorably has at least one optical illuminating element for emitting light directed at the floor surface and/or at least one diffractive or refractive element for spectrally decomposing reflected light that is detectable by means of at least one receiving element. The receiving element may be a line or field detector, for example. Advantageously, a diaphragm, which may be of slit-shaped or hole-shaped configuration, is used for suppressing ambient light.

An element for spectrally decomposing light may then be omitted in an advantageous embodiment, for example if the spectrum of the illuminating element is narrow-band enough to enable an identification of the floor type. The floor cleaning appliance may in this case have an illuminating element for emitting directed, structured light.

The spectroscopic device favorably comprises at least one transmitting and receiving module which comprises the at least one illuminating element, the at least one receiving element, and the at least one diffractive or refractive element, arranged in a common housing. A simple constructive design may thereby be achieved. The transmitting and receiving module is provided, for example, as a prefabricated unit which is fixed or may be fixed on or in a corresponding receptacle of the floor cleaning appliance. The input of scattered light may be suppressed by arranging the receiving element in the housing.

The at least one illuminating element preferably is or comprises a light-emitting diode.

It proves in practice to be advantageous if an optical transmission grating or reflection grating is provided as a diffractive element or a prism is provided as a refractive element.

The at least one illuminating element, in particular a light-emitting diode, is advantageously configured to emit light in the UV range, in the range of the visible spectrum, and/or in the NIR range (near infrared range). The use of more cost-effective technologies is possible in particular with the use of NIR light-emitting diodes with a wavelength of about 700 nm to 1100 nm. Cost-effective line or field detectors may hereby be used in the area of the receiving elements, too.

The at least one illuminating element may emit narrow-band or broad-band. The light emitted by the spectroscopic device may be a discrete spectrum or a continuous spectrum.

In an advantageous implementation, it proves to be favorable if a plurality of illuminating elements is provided which emit light of different wavelengths. This offers the possibility of providing a plurality of discrete or partially overlapping spectra and thereby obtaining comprehensive information regarding the floor type.

Preferably a plurality of annularly arranged illuminating elements is provided, which emit light to a region of the floor surface located centrally between said illuminating elements. Different illuminating elements may hereby be used, which emit light of different wavelengths, or identical illuminating elements may be used. The emission to the centrally located region ensures that information is obtained that is as comprehensive as possible regarding the floor type of a floor surface region to which light is emitted from all illuminating elements.

The spectroscopic device advantageously comprises a storage unit or is coupled to a storage unit in which information is stored linked to a respective floor type and in particular floor material, the floor type being determinable by comparing said information with the spectrum or characteristic features of the same. The storage unit may be arranged internally in the floor cleaning appliance or externally thereto. Reference spectra of different floor types and in particular floor materials may be stored in the storage unit. The floor type is able to be inferred by comparing a determined spectrum with a reference spectrum. Alternatively or in addition, information regarding characteristic structures may be stored in the storage unit, linked to a respective floor type and in particular floor materials.

It is advantageous if the floor cleaning appliance comprises a localization unit for determining the position of the floor cleaning appliance relative to the floor surface and if a map of the floor surface is stored or storable in the storage unit, linked to position-dependent information regarding the floor type. On the basis of the map of the floor surface, the floor cleaning appliance is able to automatically navigate on the floor surface or support an operator in navigation. The navigation methods familiar to the person skilled in the art may be used. It is advantageous for the floor type to be stored in the map as a function of the position. For example, which regions of the floor surface have which floor type is stored. This offers the possibility of carrying out the cleaning of the floor surface with knowledge regarding the floor type. In addition, a determination of the floor type may take place in accordance with the present invention. This makes it possible to perform a check on the information stored in the storage unit and to correct said information, as the case may be. If no information regarding the floor type is present yet in the storage unit, when determining the floor type for the first time, corresponding information may be stored as function of the position, linked to the floor surface.

It is favorable if the floor cleaning appliance comprises at least one camera for generating images of the floor surface, and if the floor type is determinable on the basis of the images and is able to be checked for agreement with the floor type determined on the basis of the spectroscopic device. The images generated by the camera deliver redundant information with which a plausibility check may be performed. The floor type may in this way be determined even more reliably with respect to an optimized cleaning of the floor surface.

Advantageously at least one camera is directed at a region of the floor surface arranged upstream of the floor cleaning appliance in relation to the main movement direction of the floor cleaning appliance. Information gained during the travel of the floor cleaning appliance may thereby be used for immediately adapting the cleaning.

Favorably, the position, amount, and/or kind of soiling of the floor surface is determinable by means the spectroscopic device on the basis of a spectral signature of the soiling. In addition to the floor type, it is advantageously determined by means of the spectroscopic device whether and in what way the floor surface is soiled. An adaptation of the cleaning to the soiling is possible, as explained above, in particular by adapting cleaning parameters and/or travel parameters.

A position, amount, and/or kind of soiling may advantageously be determined using at least one camera of the floor cleaning appliance that generates images of the floor surface, which images are examined by means of methods of image processing for the presence of soiling. A check advantageously takes place on the information regarding the soiling, gained on the basis of images from the camera and the spectral signature of the soiling, determined on the basis of the spectroscopic device. The cleaning of the floor may be optimized by, for example, cleaning parameters and/or travel parameters being adapted.

Provision may be made for a detection device and/or a camera for generating images of the floor surface to be arranged downstream of the at least one cleaning assembly in relation to a main movement direction of the floor cleaning appliance, in order to check the cleaning result on the basis of the position, amount, and/or kind of possible soiling and/or of cleaning agent residue. If residual soiling of the floor surface or cleaning agent residue, for example water, is determined after cleaning, another cleaning may be performed. Alternatively or in addition, an operator may be notified of the remaining soiling or the residue. The detection device and/or the camera is arranged, in particular, on a rear side of the floor cleaning appliance.

As already mentioned, the floor cleaning appliance may be a self-steering and self-propelled floor cleaning appliance. Alternatively or in addition, the floor cleaning appliance may be hand-guided.

The object stated at the outset is achieved by a method in accordance with the invention for cleaning a floor surface with a floor cleaning appliance, wherein a floor type is determined by means of a spectroscopic device of the floor cleaning appliance on the basis of a spectrum recorded by reflection measurement, and wherein the cleaning of the floor surface is based on the information regarding the floor type.

The advantages which were already stated in conjunction with the explanation of the floor cleaning appliance in accordance with the invention may also be achieved in carrying out the method in accordance with the invention. Reference may be made to the preceding remarks in this regard.

Advantageous embodiments of the method result from advantageous embodiments of the floor cleaning appliance in accordance with the invention. Reference may be made to the preceding remarks also in this regard.

Discussed in the following are advantageous embodiments of a floor cleaning appliance in accordance with the invention with which advantageous embodiments of the method in accordance with the invention are performable.

FIG. 1 shows in a schematic plan view a floor cleaning appliance in accordance with the invention, designated with the reference numeral 10. The floor cleaning appliance 10 is configured to be self-propelled and self-steering and allows for an autonomous cleaning of a floor surface 12.

In the example depicted in FIG. 1, the floor surface 12 is subdivided into two floor surface regions 14 and 16, which have different floor types. For example, the floor surface region 14 has a plastic flooring, for example made of PVC. The floor surface region 16 is a parquet floor, for example.

The floor cleaning appliance 10 (FIGS. 1 and 3) comprises a housing 18 in which a control unit 20 is accommodated. An undercarriage 22 that is controllable by the control unit 20 comprises two drive wheels, by way of which the floor cleaning appliance 10 can travel on the floor surface 12. The floor cleaning appliance 10 hereby travels, for example, on the basis of a predetermined travel pattern. FIG. 1 symbolizes a strip- or meander-like traveling of the floor cleaning appliance 10, wherein regions of the floor surface 12 that have not yet been traversed and cleaned are highlighted by dotting, whereas regions that have already been cleaned do not have this dotting.

The floor cleaning appliance 10 has at least one cleaning assembly 24 which is controllable in particular by the control unit 20. For example a cleaning brush and/or a suction assembly is provided as a cleaning assembly. Dirt is able to be picked up from the floor surface 12 by means of the cleaning brush and be transferred into a dirt collecting container in the housing 18 under the additional action of the suction assembly.

Presently a container with an outlet valve for a cleaning liquid, for example water or a cleaning chemical for increasing the cleaning effect, is also regarded as a cleaning assembly 24. The cleaning liquid may be applied from the container to the floor surface 12 for wetting the same. The amount of cleaning liquid may be set and thereby metered by way of the control unit 20.

Furthermore, the floor cleaning appliance 10 comprises a storage unit 26 which is coupled to the control unit 20. For example, stored in the storage unit 26 is a map of the floor surface 12 which enables the floor cleaning appliance 10 to navigate over the floor surface 12 on the basis of the route or travel pattern. All navigation methods that are known to the person skilled in the art are conceivable here. A localization member 27 that is coupled to the control unit 20 is provided in order to determine the position of the floor cleaning appliance 10 relative to the floor surface 12 in a relative and/or absolute frame of reference.

In the floor cleaning appliance 10 in accordance with the invention, it is possible to determine the floor type of the floor surface 12 by means of an optical detection device 28. It is hereby possible to differentiate whether the flooring is a plastic flooring, a laminate, a parquet, a carpet or carpeted floor, or tiling. In particular the floor material may be detected for determining the floor type. Preferably different materials of plastic, laminate, parquet, carpet or carpeting and tiles are able to be differentiated from each other. The determination of the floor type serves for setting cleaning parameters and travel parameters of the floor cleaning appliance 10 with respect to an optimized floor cleaning.

In the case of the floor cleaning appliance 10, the detection device 28 is configured as a spectroscopic device 30 with which a spectrum of the floor surface 12 is recorded and may be evaluated for determining the floor type.

Figure 4:
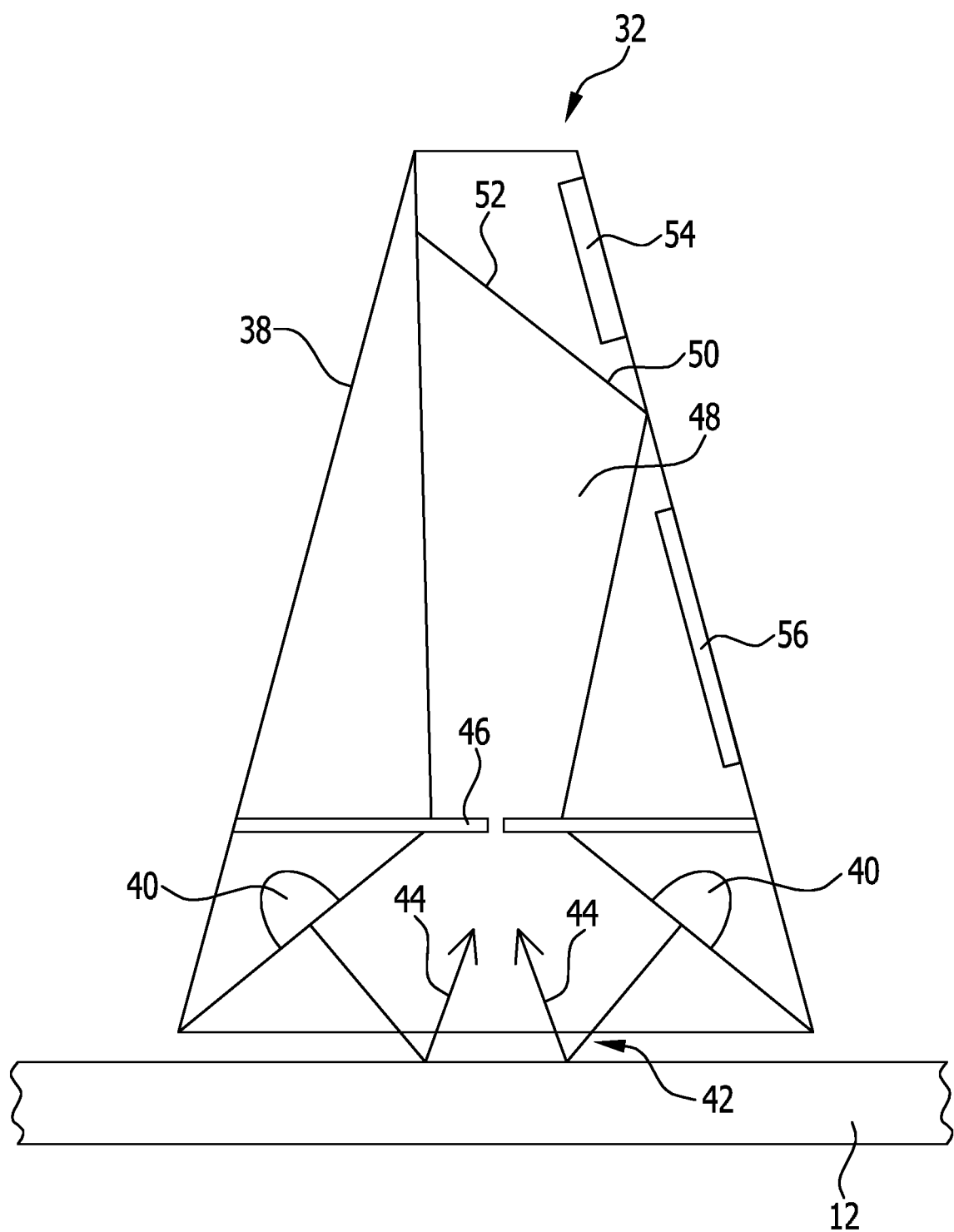
FIG. 4: shows a schematic depiction of a transmitting and receiving module of a spectroscopic device of the floor cleaning appliance from FIG. 1.

The spectroscopic device 30 has at least one transmitting and receiving module 32, which is schematically depicted in FIG. 4. The transmitting and receiving module 32 is presently arranged on a front side 34 of the floor cleaning appliance 10 in relation to the main movement direction 36 thereof. The floor cleaning appliance 10 travels along the main movement direction 36 in rectilinear straight travel.

The transmitting and receiving module 32 comprises a housing 38 which is accommodated, for example, in a corresponding receptacle of the housing 18. A plurality of illuminating elements 40 are arranged at the lower region of the housing 38 for emitting light in the direction of the floor surface 12. The illuminating elements 40 are presently configured as light-emitting diodes. It is favorable if the illuminating elements 40 are able to emit light of different spectra, wherein the wavelengths may advantageously extend from the UV range into the NIR range (about 400 nm to about 1100 nm).

In an advantageous embodiment of the floor cleaning appliance 10, provision may be made for the illuminating elements 40 to be of identical configuration and in particular to emit light in the NIR range, for example about 700 nm to about 1100 nm.

Figure 5:
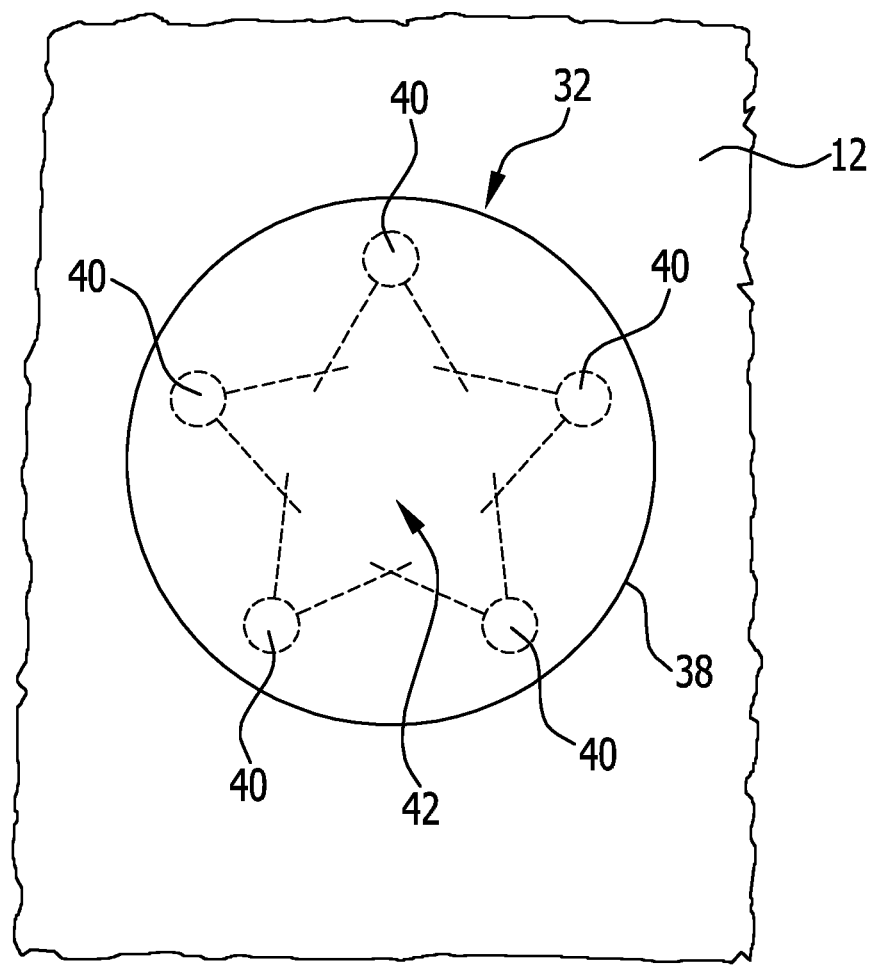
FIG. 5: shows schematically the illumination of a region of the floor surface with the transmitting and receiving module from FIG. 4.

Presently, the illuminating elements 40 are arranged annularly and emit light to a region 42 of the floor surface 12 arranged centrally between said illuminating elements 40 (FIGS. 4 and 5). Light that is emitted by the illuminating elements 40 is reflected by the floor surface 12. The path of the light is depicted schematically in FIG. 4 by means of arrows 44.

Reflected light passes an aperture of a diaphragm 46 arranged above the illuminating elements 40 and enters into a space 48 enclosed by the housing 38. An element for spectrally decomposing the incident light is arranged in the space 48. Said element is presently configured as a diffractive optical element 50, presently in the form of a transmission grating 52. Alternatively, a refractive optical element may be used, for example a prism.

The light that is spectrally decomposed by the transmission grating 52 reaches a receiving element 54. The receiving element 54 is configured, for example, as a line detector or as a field detector (array). An output signal of the receiving element 54 may be provided to a data processing element 56 of the transmitting and receiving module 32. The data processing element 56 is in signal-operative connection with the control unit 20. Alternatively, an output signal of the receiving element 54 may be transmitted directly to the control unit 20. The control unit 20 is thus presently a constituent part of the spectroscopic device 30.

FIG. 6 shows, by way of example and schematically, four spectra which were generated from different floor types of the floor surface 12 by the spectroscopic device 30. By evaluating the spectra, the control unit 20 is able to determine the respective floor type. In FIG. 6, the abscissa shows the wavelength in arbitrary units and the ordinate shows the intensity of the light received by the receiving element, also in arbitrary units. A first spectrum, depicted by means of a solid line 58, comes from a floor with plastic material, for example PVC. A second spectrum, depicted by means of a dashed line 60, comes from a parquet floor. A third spectrum, depicted by means of a dashed and dotted line 62, comes from a carpeted floor. A fourth spectrum, depicted by means of a dotted line 64, comes from a tiled floor.

It can be seen in the exemplary depiction of FIG. 6 that all spectra 58, 60, 62, and 64 comprise substantially three characteristic structures, a structure 66 in the range of a rather small wavelength, a structure 68 in the range of a medium wavelength, and a structure 70 in the range of a rather large wavelength. However, the structures 66, 68, and 70 differ significantly from each other with respect to intensity, form, and width.

For determining the floor type, the control unit 20 may evaluate the spectra 58, 60, 62, and 64 in relation to the occurrence of characteristic structures 66, 68, 70 with a predetermined wavelength, in relation to absolute intensity of at least one characteristic structure 66, 68, 70, in relation to relative intensity and/or position of two or more characteristic structures 66, 68, 70 to each other, and/or in relation to the shape of at least one characteristic structure 66, 68, and 70.

In the present case, the spectrum 60 is characterized, for example, by a relatively wide structure 68 and a relatively high structure 66. The structure 68 further comprises a prominent substructure 69. This allows for the spectrum 58 to be differentiated from the other spectra 60, 62, 64.

The spectra 60 and 64 are similar to each other with respect to the shape of the structure 68, but the substructure 69 in the case of the spectrum 64 is more prominent. Furthermore, the spectrum 64 comprises a higher intensity in the region of the structure 66. The spectra 60 and 64 can be differentiated from each other in this way.

The spectrum 62 projects substantially beyond the spectra 58, 60, and 64 in the region of the structure 70 and moreover has significant differences to the spectra 58, 60, and 64 with respect to form and width of the structure 68, such that an identification of the spectrum 62 is also possible.

Information regarding the respective characteristic structures 66, 68, 70 to be expected are stored in the storage unit 26, linked to a respective floor type and in particular floor material. By comparing the results of the evaluation with the stored information, the control unit 20 is able to unambiguously determine the floor type.

Alternatively or in addition, reference spectra may be stored in the storage unit 20, linked to a respective floor type and in particular floor material. The floor type is able to be inferred by a comparison of an obtained spectrum 58, 60, 62, or 64 with the reference spectra.

In dependence on the determined floor type, the floor cleaning appliance 10 may adapt cleaning parameters of the at least one cleaning assembly 24 as explained above for optimizing the cleaning. Alternatively or in addition, travel parameters of the floor cleaning appliance 10 may be adapted by controlling the undercarriage 22. For example the speed, the route, or the travel pattern is adapted.

When a floor type is determined that should not be cleaned, the route may be adapted to bypass the corresponding floor surface region. Alternatively, a traversing of the floor surface region is conceivable without using a cleaning assembly 24.

Figure 2:
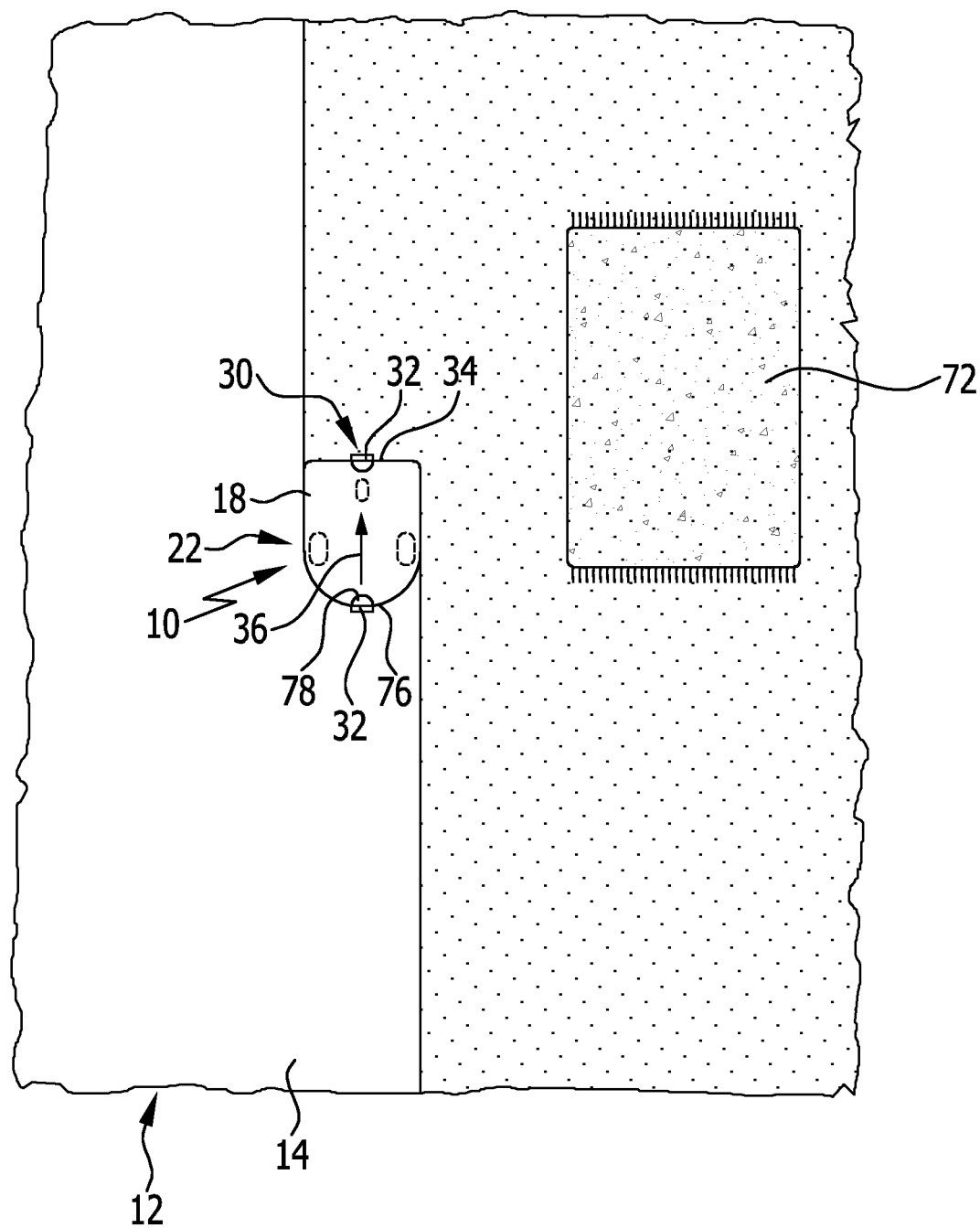
FIG. 2: shows a depiction corresponding to FIG. 1 in the case of a different floor surface.

FIG. 2 shows schematically a situation that is different from FIG. 1, in which the floor surface 12 comprises the floor surface region 14, for example with a plastic floor, and a carpet 72 positioned thereon. It is assumed that the floor surface region 14 should be swept, vacuumed, and wet-cleaned, whereas the carpet 72 should only be swept and vacuumed, but not wet-cleaned.

On the basis of the information of the spectroscopic device 30, the carpet 72 is able to be recognized and the at least one cleaning assembly 24 controlled to the effect that, during travel over the carpet 72, no cleaning liquid leaks out, but only a dry cleaning with sweeping and vacuuming takes place.

The map of the floor surface 12 in the storage unit 26 may be stored with position-dependent information regarding the determined floor type. In later cleanings of the floor surface 12 taking the map into account, the floor cleaning appliance 10 knows the floor type and is able to carry out a presetting of cleaning parameters and/or travel parameters. During the cleaning, a check of the floor type may be performed.

In the floor cleaning appliance 10, it is advantageously possible to detect with the spectroscopic device 30 the kind, amount, and/or position of soiling of the floor surface 12. For this purpose, the spectra of the spectroscopic device 30 may be analyzed for the presence of a spectral signature of soiling. When a characteristic spectral signature of soiling is found, cleaning parameters and/or travel parameters of the floor cleaning appliance 10 may be adapted for optimizing the cleaning.

The floor cleaning appliance 10 may furthermore have a further transmitting and receiving module 32 which is arranged, for example, on a rear side 76 of the floor cleaning appliance 10. With the transmitting and receiving module 32, after the cleaning takes place, an examination of the floor surface 12 for the kind, amount, and/or position of soiling and cleaning agent residue may be performed behind the floor cleaning appliance 10.

Furthermore, the floor cleaning appliance 10 may comprise at least one camera 78 with which images of the floor surface 12 may be generated. The images may, for example, be evaluated by the control unit 20 by means of methods of image processing. Presently, a first camera 78 is present on the front side 34 and a further camera 78 is present on the rear side 76. The camera 78 on the front side 34 is directed at a region of the floor surface 12 that is arranged upstream of the floor cleaning appliance 10, and the camera 78 on the rear side 76 is directed at a region of the floor surface 12 that is located behind the floor cleaning appliance 10.

Images that are generated by the camera 78 on the front side 34 may be evaluated to determine the floor type of the floor surface 12. A determination made here may be checked for agreement with the floor type determined on the basis on the spectroscopic device 30. This allows for an even more reliable determination to be made regarding the floor type in order to improve the cleaning.

Moreover, the floor type 12 may be checked by means of the camera 78 on the front side 34 for the kind, amount, and/or position of soiling. In a corresponding manner, after a cleaning takes place, the floor surface may be checked by means of the camera 78 on the rear side 76 for remaining soiling and cleaning agent reside.

If, after cleaning, soiling is determined by means of the spectroscopic device 30 or on the basis of the images of the camera 78, another cleaning of the floor surface 12 may be performed, at least in sections. Residue of cleaning agent, for example water, may be suctioned away or wiped up, for example.

FIG. 7 shows schematically a further preferred embodiment of a floor cleaning appliance in accordance with the invention, designated with the reference numeral 80. Identical reference numerals are used for like or functionally equivalent features and components of the floor cleaning appliances 10, 80. Only the most significant differences are discussed.

The floor cleaning appliance 80 is a hand-guided floor cleaning appliance which may be moved by an operator 82 over the floor surface 12. Provision may additionally be made for the floor cleaning appliance 80 to be of self-propelled and self-steering configuration.

Figure 3:
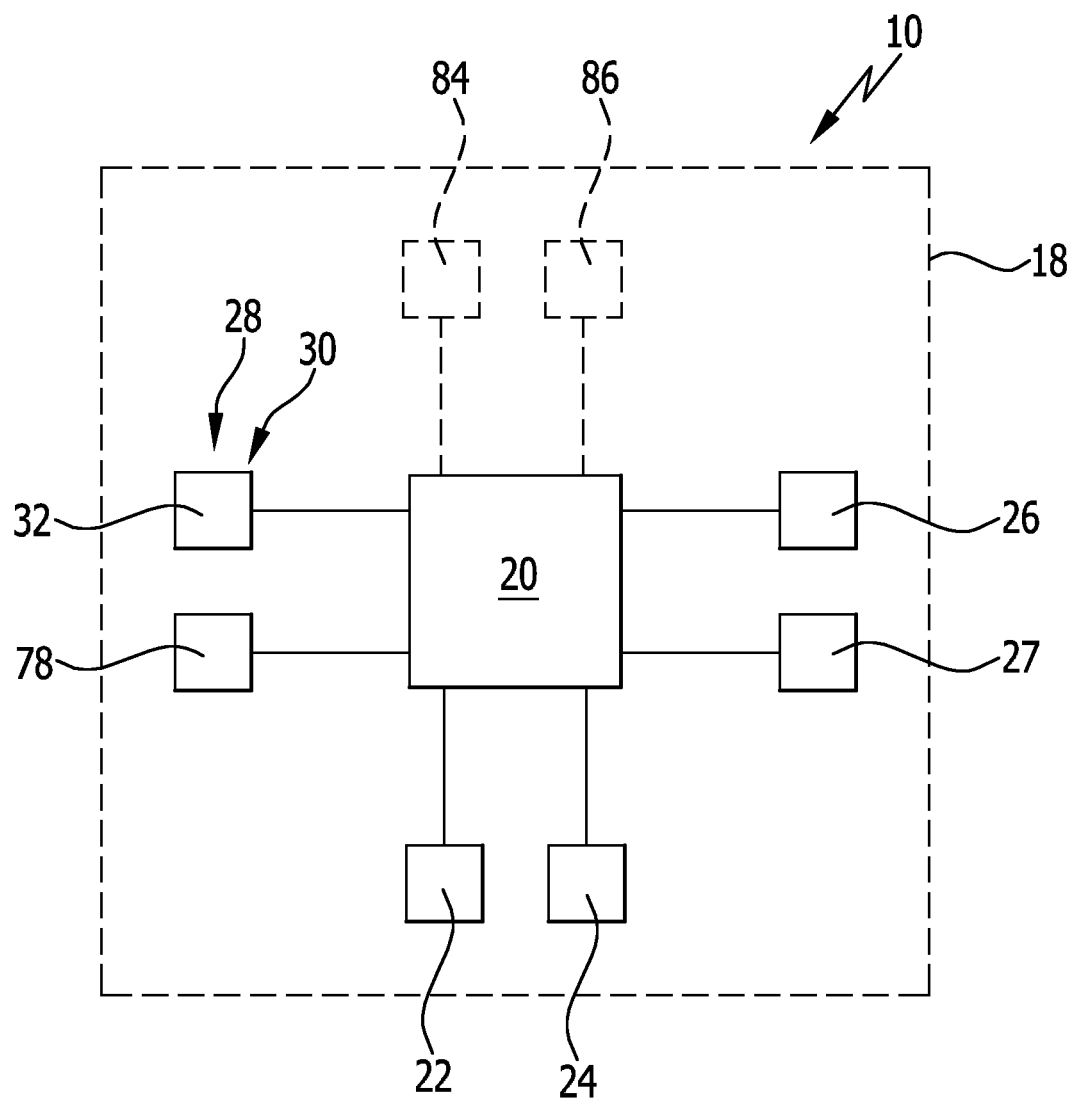
FIG. 3: shows a schematic block diagram of the floor cleaning appliance from FIG. 1.

In the floor cleaning appliance 80, an operating unit 84 and an indication unit 86, for example an optical display unit, is provided for the operator 12. The operating unit 84 and the indication unit 86 are depicted in FIG. 3 with a dashed line. In that respect, the schematic block diagram from FIG. 3 also corresponds to a schematic block diagram of the floor cleaning appliance 80.

The operator 82 may operate the floor cleaning appliance 80 by way of the operating unit 84. Information, in particular regarding the determined floor type and preferably also regarding soiling of the floor surface 12, may be displayed to the operator 82 on the indication unit 86.

The floor cleaning appliance 80 can automatically set, for example, cleaning parameters and/or travel parameters in dependence on the floor type determined and/or submit a suggestion regarding this to the operator 82 at the indication unit 86. The operator 82 may accept or, if necessary, modify this suggestion by means of the operating unit 84.

REFERENCE NUMERALS

- 10 floor cleaning appliance
- 12 floor surface
- 14, 16 floor surface region
- 18 housing
- 20 control unit
- 22 undercarriage
- 24 cleaning assembly
- 26 storage unit
- 27 localization unit
- 28 detection device
- 30 spectroscopic device
- 32 transmitting and receiving module
- 34 front side
- 36 main movement direction
- 38 housing
- 40 illuminating element
- 42 region
- 44 path of light
- 46 diaphragm
- 48 space
- 50 diffractive optical element
- 52 transmission grating
- 54 receiving element
- 56 data processing element
- 58, 60, 62, 64 spectrum
- 66, 68, 70 structure
- 59 substructure
- 72 carpet
- 76 rear side
- 78 camera
- 80 floor cleaning appliance
- 82 operator
- 84 operating unit
- 86 indication unit

The invention claimed is:

1. A floor cleaning appliance which comprises at least one cleaning assembly for cleaning a floor surface and an optical detection device with which a floor type is determinable,
    wherein the detection device is configured as or comprises a spectroscopic device with which the floor type is determinable on the basis of a spectrum of the floor surface recorded by reflection measurement;
    wherein the spectroscopic device has at least one optical illuminating element for emitting light directed at the floor surface, at least one diffractive or refractive element for spectrally decomposing reflected light and at least one receiving element for detecting the spectrally decomposed light;
    wherein for evaluating the spectrum, characteristic features thereof are determined on the basis of at least one of relative intensity and position of two or more characteristic structures to each other;
    wherein for adapting the cleaning to the floor surface the floor cleaning appliance bypasses or avoids a floor surface region with a predetermined floor type that should not be traversed; and
    wherein a second spectroscopic device is arranged downstream, in relation to a main movement direction of the floor cleaning appliance, of the at least one cleaning assembly in order to check the cleaning result on the basis of a cleaning agent residue.

* * * * *